United States Patent [19]

Nitta et al.

[11] Patent Number: 4,641,264

[45] Date of Patent: Feb. 3, 1987

[54] METHOD FOR AUTOMATIC TRANSLATION BETWEEN NATURAL LANGUAGES

[75] Inventors: Yoshihiko Nitta, Fujisawa; Atsushi Okajima, Yokohama; Fumiyuki Yamano, Kawasaki, all of Japan

[73] Assignee: Hitachi, Ltd., Tokyo, Japan

[21] Appl. No.: 415,601

[22] Filed: Sep. 7, 1982

[30] Foreign Application Priority Data

Sep. 4, 1981 [JP] Japan .............................. 56-138586

[51] Int. Cl.⁴ ............................................. G06F 15/38
[52] U.S. Cl. .................................... 364/900; 364/419
[58] Field of Search ... 364/200 MS File, 900 MS File, 364/419; 434/157, 167, 169, 176

[56] References Cited

U.S. PATENT DOCUMENTS

| | | | |
|---|---|---|---|
| 4,393,460 | 7/1983 | Masuzawa et al. | 364/900 |
| 4,502,128 | 2/1985 | Okajima et al. | 364/900 |
| 4,503,426 | 3/1985 | Mikulski | 364/900 |
| 4,597,055 | 6/1986 | Hashimoto et al. | 364/900 |

OTHER PUBLICATIONS

Garr et al, The Handbook of Artificial Intelligence, vol. I, pp. 234-238 (1981).

Booth, "Language Translation", in Encyclopedia of Computer Science, Ralston, editor, 1976, pp. 764-769.

*Primary Examiner*—Eddie P. Chan
*Attorney, Agent, or Firm*—Antonelli, Terry & Wands

[57] ABSTRACT

An automatic translation method between natural languages comprises assigning parts of speech to words/idioms of an input text sentence by looking up a lexicon storage. The input text sentence in the form of string of parts of speech is segmented into phrasal elements as minimum units having linguistic meaning to assign parts of speech to the respective elements. The sequence of phrasal parts of speech is converted to a string of syntatic roles to the respective phrasal elements and words/idioms. Patterns representing a sentence, a clause and a quasi-clause are detected from the sequence of syntatic roles to transform the input text sentence to a skeleton pattern represented by a combination of those patterns. The sequence of the simple sentence, clause and quasi-clause inherent to the input language which forms the skeleton pattern is transformed to a sequence inherent to the output language. The sequence of syntatic roles of the simple sentence, clause and quasi-clause inherent to the input language which forms the transformed skeleton pattern is transformed to a sequence inherent to the output language. Finally, target language equivalents are assigned to the transformed string of syntatic roles.

18 Claims, 42 Drawing Figures

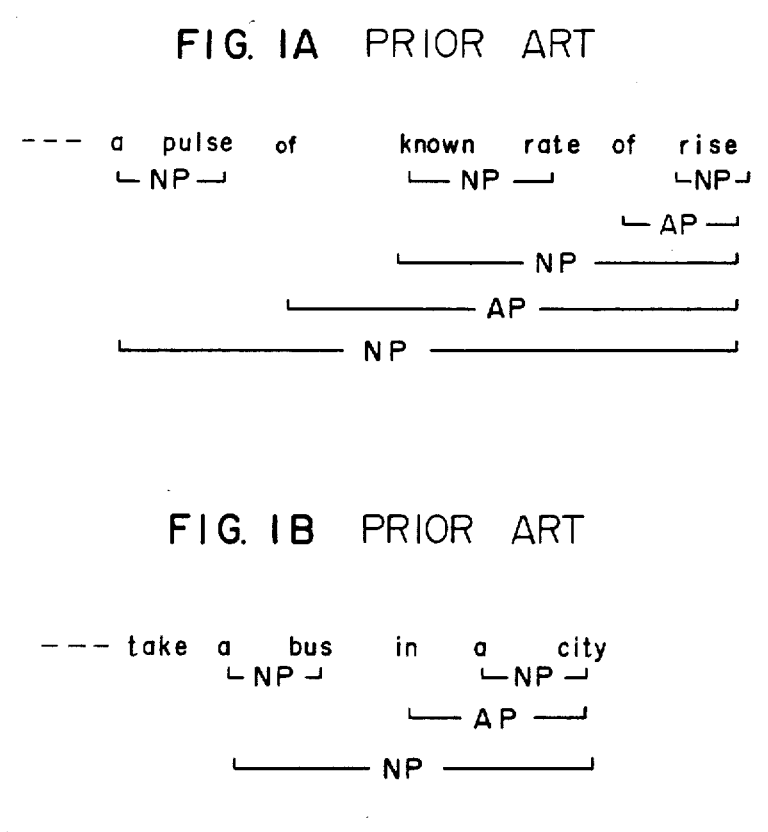

FIG. IA  PRIOR ART

```
--- a   pulse   of      known   rate   of   rise
    └─NP─┘              └─ NP ─┘           └─NP─┘
                                       └─ AP ─┘
                        └──────── NP ────────┘
                └──────────── AP ────────────┘
    └──────────────── NP ────────────────────┘
```

FIG. IB  PRIOR ART

```
--- take  a   bus    in   a   city
         └─NP─┘          └─NP─┘
                      └─ AP ─┘
         └──────── NP ────────┘
```

FIG. 4A

| 1 | 2 | 3 | 4 | --- | N |
|---|---|---|---|---|---|
| INDEX WORD / WORD INFORMATION | | | | | |

FIG. 4B

| INDEX WORD (STUDY) ||
|---|---|
| NUMBER OF IDIOMS (6) | START ADDRESS OF IDIOMS (76) |

| NUMBER OF PARTS OF SPEECH (2) | PART OF SPEECH 1 (V) | PART OF SPEECH 2 (N) | ---- |
|---|---|---|---|

| 1ST PART OF SPEECH (V) ||||
|---|---|---|---|
| SUB-CLASS OF PART OF SPEECH | ATTRIBUTE 1 | ATTRIBUTE 2 | ---- |
| NUMBER OF AMBIGUITIES (2) | TARGET LANGUAGE EQUIVALENT 1 (benkyō suru) | TARGET LANGUAGE EQUIVALENT 2 (kenkyū suru) | ---- |
| | CONJUGATION 1 (SA-HEN CONJUGATION "benkyō") | CONJUGATION 2 (SA-HEN CONJUGATION "kenkyū") | ---- |
| | ATTACHED FUNCTION WORD 1 (OBJ "wo") | ATTACHED FUNCTION WORD 2 (OBJ "wo") | ---- |

| 2ND PART OF SPEECH N |
|---|

FIG. 5A

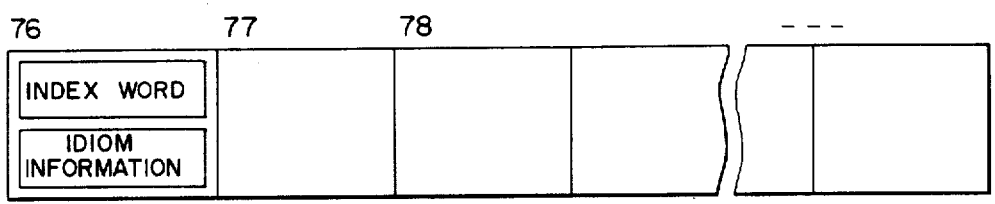

FIG. 5B

| \[76\] FIXED IDIOM INDEX PATTERN (MAKE A STUDY OF) | | | |
|---|---|---|---|
| NUMBER OF PARTS OF SPEECH (1) | PART OF SPEECH 1 (V) | PART OF SPEECH 2 | ----- |
| SUB-CLASS OF 1ST PART OF SPEECH | ATTRIBUTE 1 | ATTRIBUTE 2 | ----- |
| NUMBER OF AMBIGUITIES (1) | TARGET LANGUAGE EQUIVALENT 1 (kenkyū wo suru) | TARGET LANGUAGE EQUIVALENT 2 | ----- |
|  | CONJUGATION (SA-HEN CONJUGATION "kenkyū wo") | CONJUGATION 2 | ----- |
|  | ATTACHED FUNCTION WORD 1 (OBJ "no") | ATTACHED FUNCTION WORD 2 | ----- |
| UNDER STUDY | | | |

FIG. 5C

| \multicolumn{4}{c|}{SPLIT IDIOM INDEX PATTERN} |
|---|---|---|---|
| \multicolumn{4}{c|}{(TAKE IN INTO CONSIDERATION)} |
| NUMBER OF PARTS OF SPEECH (1) | PATR OF SPEECH 1 (V) | PART OF SPEECH 2 | - - - - |
| SUB-CLASS OF 1ST PART OF SPEECH (3) | ATTRIBUTE 1 | ATTRIBUTE 2 | - - - - |
| NUMBER OF AMBIGUITIES (1) | TARGET LANGUAGE EQUIVALENT 1 (IN wo kōryo suru) | TARGET LANGUAGE EQUIUALENT 2 | |
| | CONJUGATION 1 (SA-HEN CONJUGATION "kōryo") | CONJUGATION 2 | |
| | ATTACHED FUNCTION WORD 1 NONE | ATTACHED FUNCTION WORD 2 | |

FIG. 6A

| ITEM NO. | PATTERN OF PROHIBITED SEQUENCE OF PARTS OF SPEECH | | | | | PROHIBITION RELEASE RULE 1 | | | | | | PROHIBITION RELEASE RULE 2 | |
|---|---|---|---|---|---|---|---|---|---|---|---|---|---|
| | $F_2$ | $F_1$ | * | $B_1$ | $B_2$ | 1 | | 2 | | 3 | | | |
| 1 | — | to | -V | — | — | | | | | | | | |
| 2 | — | ADJ | V | — | — | $F_2$ | ART | $F_2$ | BE | | | | |
| 3 | — | V | V | — | — | $F_1$ | ING | * | BE | | | $F_1$ | HELP |
| 4 | — | $PRV_M$ | $V_S$ | — | — | | | | | | | | |
| 5 | — | $N_M$ | $V_S$ | — | — | | | | | | | | |
| 6 | — | $N_1$ | $V_P$ | — | — | | | | | | | | |
| 7 | — | $V_7$ | ADJ | — | — | | | | | | | | |

FIG. 6B

| PRN | $V_7$ | ADJ | ADV | ADV |
|---|---|---|---|---|
| $F_2'$ | $F_1'$ | * | $B_1'$ | $B_2'$ |

FIG. 7

| ITEM NO. | PATTERN OF PARTS OF SPEECH TO BE SEGMENTED AS A PHRASAL ELEMENT | | | | PART OF SPEECH ASSIGNED TO PHRASAL ELEMENT |
|---|---|---|---|---|---|
| 1 | ADV | --- | ADV | | ADV |
| 2 | PREP | N | --- | N | PRENAL |
| 3 | AUX | --- | AUX | V | V |
| 4 | AUX | NOT | V | | V |
| 5 | TO | V | | | TOV |
| 6 | V | AND | V | | V |

FIG. 8A

| ITEM NO. | TYPE OF VERB NEXT TO * | SEQUENCE OF PART OF ARTICLE (*:INDEX WORD) | | | SYNTACTIC ROLE OF PATTERN ADJACENT TO * | | | VERB AT POSITION * |
|---|---|---|---|---|---|---|---|---|
| 1 | V1 | N PRN | * | N PRN | SUBJ | GOV | COMP | be |
| 2 | V1 | * | N PRN | | | GOV | COMP | |
| 3 | V3 | N PRN | * | | SUBJ | GOV | | |
| 4 | TOV6 | * | TOV | | | TOGOV | TOOBJ | like |
| 5 | TOV6 | N PRN | V | * | SUBJ | GOV | TOOBJ | |
| 6 | V7 | N PRN | * | N PRN | SUBJ | GOV | OBJ | write |
| 7 | V10 | N PRN | * | N PRN | N SUBJ | GOV | OBJ1 OBJ2 | give |
| 8 | V11 | N PRN | * | N PRN | ADJ SUBJ | GOV | OBJ COMP | paint |
| | — | | — | | | — | | — |

FIG. 8B

| ITEM NO. | SPELLING OF CONJUNCTION WORD NEXT TO POSITION * | PATTERN OF STRING OF SYNTATIC ROLES (*: INDEX WORD) | | | | SYNTATIC ROLE OF * |
|---|---|---|---|---|---|---|
| 1 | BUT | DEL | * | SUBJ | GOV | BUT |
| 2 | IF | SUBJ | GOV ($V_8$) | * | SUBJ | NIF |
| 3 | IF | * | SUBJ | GOV | | ADIF |
| 4 | IF | SUBJ | GOV | OBJ | * | ADIF |
| 5 | IF | SUBJ | GOV | OBJ | DEL | ADIF |
| 6 | THAT | SUBJ | GOV | * | SUBJ | NTHAT |

FIG. 8C

| ITEM NO. | SYNTATIC ROLE OF PRECEDING CONJUCTION | PATTERN PRECEDING TO NEXT CONJUCTION OR PUNCTUATION | | | | CLAUSE PATTERN |
|---|---|---|---|---|---|---|
| 1 | φ, AND OR, BUT | SUBJ | GOV | | | $\frac{\text{TYE\#}}{\text{SENT}}^S$ #=1,2,3 (EXCLUDING PRECEDENT) |
| 2 | φ, AND OR, BUT | SUBJ | GOV | COMP | | $\frac{\text{TYP\#}}{\text{SENT}}^S$ #=1,2 (EXCLUDING PRECEDENT) |
| 3 | φ, AND OR, BUT | SUBJ | GOV | OBJ | | $\frac{\text{TYP\#}}{\text{SENT}}^S$ #=7 (EXCLUDING PRECEDENT) |
| 4 | GOV, INGGOV | TOGOV | TOOBJ | | | $\frac{\text{TYP\#}}{\text{OBJ}}^Q$ #=6,8 (EXCLUDING PRECEDENT) |
| 5 | GOV, INGGOV | TOGOV | OBJ | | | $\frac{\text{TYP\#}}{\text{OBJ}}^Q$ #=7 (EXCLUDING PRECEDENT) |
| 6 | ADIF | SUBJ | GOV | COMP | | $\frac{\text{TYP\#}}{\text{CADV}}^C$ #=1,2 (INCLUDING PRECEDENT) |

| ITEM NO. | ARRANGEMENT OF CLAUSE PATTERN | | | | | SKELETON PATTERN |
|---|---|---|---|---|---|---|
| 1 | φ | ---C<br>--- | φ | | | ---S<br>SENT |
| 2 | ---S<br>SENT | ---W<br>DEL | CNJ W<br>{AND<br>OR<br>BUJ} | ---S<br>SENT | ---W<br>DEL | COMPD S<br>SENT |

| 1 H | 2 E | 3 | 4 W | 5 R | 6 O | 7 T | 8 E | 9 | 10 E | 11 N |
|---|---|---|---|---|---|---|---|---|---|---|
| 12 G | 13 L | 14 I | 15 S | 16 H | 17 | 18 V | 19 E | 20 R | 21 Y | 22 |
| 23 S | 24 L | 25 O | 26 W | 27 L | 28 Y | 29 | 30 | 31 B | 32 U | 33 T |
| 34 | 35 H | 36 E | 37 | 38 L | 39 I | 40 K | 41 E | 42 D | 43 | 44 T |
| 45 O | 46 | 47 S | 48 T | 49 U | 50 D | 51 Y | 52 | 53 T | 54 O | 55 |
| 56 R | 57 E | 58 A | 59 D | 60 | 61 A | 62 N | 63 D | 64 | 65 W | 66 R |
| 67 I | 68 T | 69 E | 70 | 71 I | 72 N | 73 | 74 E | 75 N | 76 G | 77 L |
| 78 I | 79 S | 80 H | 81 | 82 A | 83 T | 84 | 85 S | 86 C | 87 H | 88 O |
| 89 O | 90 L | 91 . | 92 (END) | | | | | | | |

402

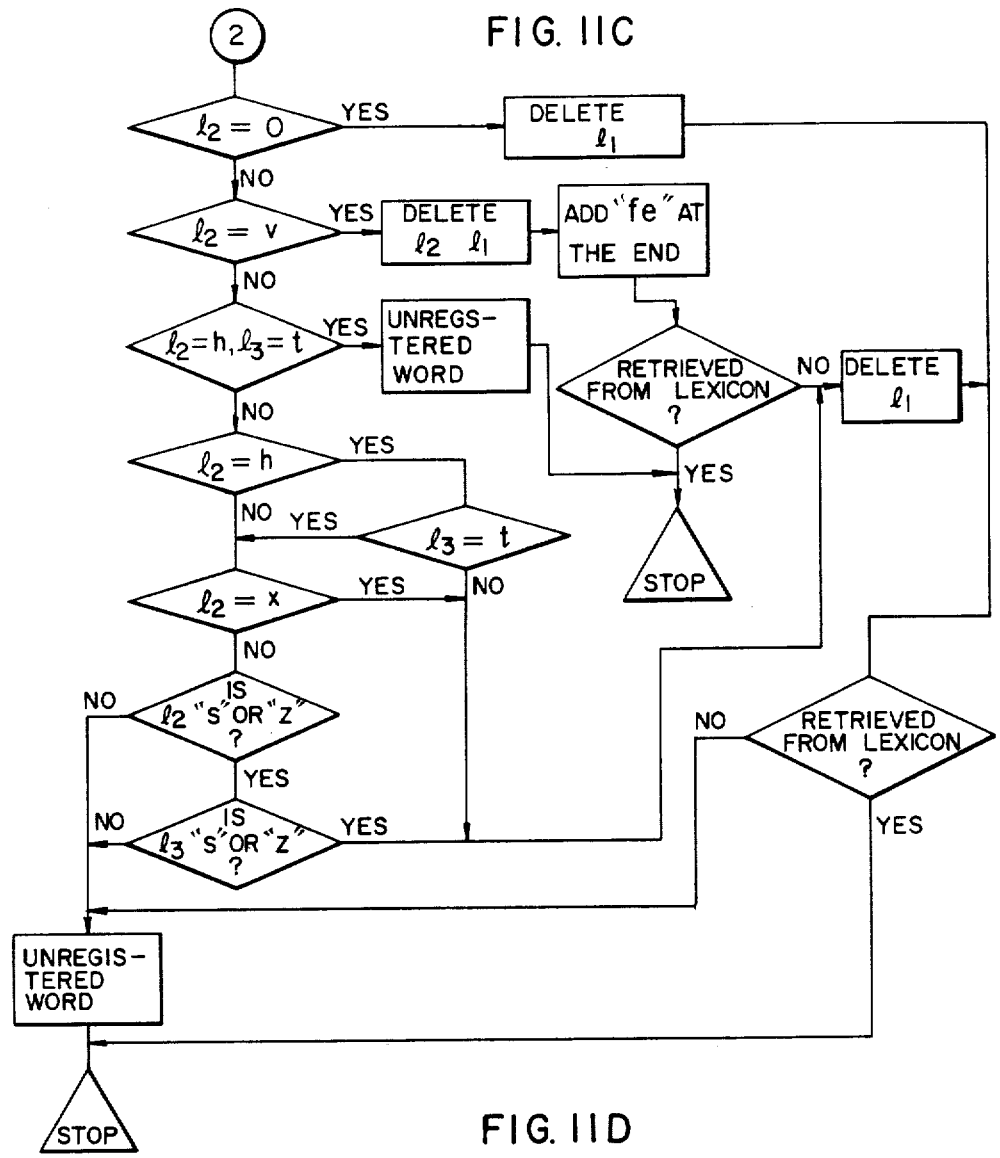

FIG. 15

|      | PRN | N   | ADJ | CNJ | V   | AUX | ADV | PREP | ART | INT | NOT |
|------|-----|-----|-----|-----|-----|-----|-----|------|-----|-----|-----|
| PRN  |     |     |     |     |     |     |     |      |     |     |     |
| N    |     | ≐   |     |     |     |     |     |      |     |     |     |
| ADJ  | >   | >   |     |     |     |     |     |      |     |     |     |
| CNJ  | >   | >   | <   |     |     |     |     |      |     |     |     |
| V    |     | <   | >   |     |     |     |     |      |     |     |     |
| AUX  |     | >   |     |     | >   |     |     |      |     |     |     |
| ADV  | <   | <   | <   | >   | >   |     |     |      |     |     |     |
| PREP |     |     |     |     |     |     |     |      |     |     |     |
| ART  | >   | >   | >   | >   | <   |     | >   |      |     |     |     |
| INT  |     | >   |     |     |     |     |     |      |     |     |     |
| NOT  |     | <   |     |     |     |     |     |      | >   |     |     |

FIG. 23

| | EN(1) | EN(2) | EN(3) | EN(4) | EN(5) | EN(6) |
|---|---|---|---|---|---|---|
| | 27 (SENT) | 6 (DEL) | 7 (BUT) | 29 (SENT) | 20 (DEL) | |

406

| | | | | | | |
|---|---|---|---|---|---|---|
| JN(1) | (27) SENT | (6) , | (7) BUT | (29) SENT | (20) . | |
| JN(2) | (1) SUBJ | (3) OBJ | (21) ADVAL | (2) GOV | | |
| JN(3) | (9) SUBJ | (25) ADVAL | (24) OBJ | (26) ADVAL | (22) OBJ | (9) GOV |
| JN(4) | | | | | | |

407

METHOD FOR AUTOMATIC TRANSLATION BETWEEN NATURAL LANGUAGES

BACKGROUND OF THE INVENTION

The present invention relates to a method for automatic translation between natural languages, and more particularly to a method for automatically translating English sentences into Japanese sentences.

The present method is applicable not only to the translation of English-into-Japanese but also to the translation between any different natural languages and further applicable to the translation between different representations of the same language, for example, the translation of a sentence written in Kana characters into a sentence written in Kana and Kanji characters. In the following description, for the sake of convenience, it is assumed that the input language is English and the output language is Japanese, although the present method is not limited thereto.

A method for automatically translating a sentence expressed in one natural language to a sentence expressed in other natural language is disclosed in the Journal of Institute of Electrical Engineering and Communication of Japan, Vol. 46, No. 11, pp. 1730–1739.

The prior art method disclosed therein is briefly explained below. When an English text is inputted, a lexicon is reference to convert a sentence consisting of a sequence of words to a string of parts of speech. In many cases, however, the part of speech of a word is not uniquely determined. For example, a word "study" is used either as a noun or as a verb. In such a case, words which allow the unique determination of the part of speech are first selected, and the part of speech of the words, before and after the word having a unique part of speech are determined next. For a word whose part of speech cannot be eventually determined, candidates of possible parts of speech are registered and one of the parts of speech in the candidates is tentatively selected. A string of parts of speech which is equal to a preregistered registered pattern of a string of parts of speech for a phrase or a clause is searched. If an equal one is found, the phrase or a clause is searched. If an equal one is found, the phrase or clause is replaced by a part of speech symbol.

For example, for a given sentence of "... a pulse of known rate of rise" as shown in FIG. 1, "a pulse" and "known rate" are determined to be noun phrases (NP), respectively. Then, "of+ rise"is replaced by an adjective phrase (AP), "known rate +of + rise" is replaced by a noun phrase and "of+known rate+of+rise" is replaced by an adjective phrase. In this manner, one sentence is converted to a simple pattern of a string of parts of speech. The converted pattern of a string of parts of speech is compared with a preregistered standard pattern of a string of parts of speech which constitutes a sentence. If they are equal, it is determined that the pattern is translatable and the sequence of words is transformed in accordance with a predetermined rule.

If the converted pattern of a string of parts of speech is not equal to the registered standard pattern, it is determined that the sequence of the parts of speech of the words is not appropriate and the part of speech of the multiple parts of speech word is replaced by other one of the registered candidates and the above process is repeated. Thus, when a word has multiple parts of speech, a feedback loop is used to determine the part of speech of the word.

Finally, Japanese equivalents are assigned to English words arranged in a transformed sequence so that a Japanese version of the English text is produced.

However, the prior art automatic translation method described above has many problems as discussed below.

Firstly, the determination of the multiple parts of speech word is very complex and hence the chance of successful translation tends to be low. In the prior art method, when one word has multiple parts of speech, one of the parts of speech is tentatively selected and the structure of the sentence is analized using a pattern dictionary, and if this does not succeed, another part of speech is selected and the process is repeated. In actuality, however, there are many words which have multiple parts of speech, and when a sentence is complicated, the number of possible strings of parts of speech for a sentence amount to a huge number. The need to repeat the same process for those strings of parts of speech many times results in a reduction of the translation speed. In addition, if a wrong part of speech is tentatively selected and the resulting string of parts of speech happens to be equal to the pattern registered in the dictionary, a wrong translation processing will be carried out.

Accordingly, the more complex the sentence is, the lower is the chance of correct translation or the chance of success.

Secondly, even if the part of speech of the word is correctly determined, mistranslation may occur because phrases are sequentially segmented from the beginning or the end of the sentence when the phrases or the clauses are replaced by parts of speech, without analyzing the relationship between phrases/clauses and words which they modify or relate to, that is, the dependency and modifying relation. For example, when the sentence "... take a bus in a city" shown in FIG. 1B is analyzed in the same manner as shown in FIG. 1A, "a bus in a city" is recognized as one noun phrase, as a result, the translated sentence will mean "take a [bus in a city]". This mistranlation is caused because "in a city" which is an adverbial phrase to modify "take" is recognized as an adjective phrase to modify "a bus" when the phrases are segmented in sequence from the end of the sentence. In this manner, when the phrases are segmented in sequence from the beginning or the end of the sentence, the part of speech of the phrase may not be uniquely determined. If a sentence has a hierarchical structure, that is, if the sentence includes complex modifying words, phrases or clauses, it cannot be translated correctly.

Thirdly, in the prior art system, an entire program of a processing system must be modified when the kinds of sentences to be translated are to be increased. Thus, once the system has been completed, it is very difficult to increase the kinds of sentences. In the prior art system, feedback loops are used to determine the part of speech of the multiple parts of speech word and a structure analysis routine by the pattern dictionary is included in the feedback loops. Accordingly, when the registered patterns of the pattern dictionary are to be added or modified, the processing algorithm must be modified so as not to cause a discrepancy in the overall operation of the feedback loops. Normally, the probability of success in the automatic translation largely depends on the structure of the registered patterns for syntactic analysis. Accordingly, the addition and the modification of the registered patterns must be effected in a trial and error method. Thus, it is a big burden to modify the processing algorithm for each addition or modification.

SUMMARY OF THE INVENTION

It is an object of the present invention to provide a novel automatic translation method which resolves the problems encountered in the prior art.

More specifically, it is a principal object of the present invention to provide a method capable of correctly translating a complicated sentence(s) with a high probability of success and which facilitates the addition of sentence patterns.

In order to achieve the above objects, in accordance with the present method, the translation between natural languages is carried out through a processing shown in FIG. 2.

First, an English text is read in and it is written in an input data buffer storage (text input processing). Next, a lexicon is looked up to convert words in the text having inflection such as conjugation, plural inflection and degree inflection to stems (dictonary look-up). Then, a string of words and idioms in the text is converted to the corresponding string of parts of speech (part of speech analysis). Then, the sentence converted to the string of parts of speech is divided into minimum units with linguistic meaning, that is, phrasal elements, such as a sequence of nouns, auxiliary verb+verb, article+noun, preposition+noun, and adjective+noun (phrase structure analysis). Each of the phrasal elements is then replaced by a phrasal part of speech such as noun phrase, adjective phrase, adverbial phrase, verb phrase or prepositional phrase. Then, the lexicon is again looked up. Next, the string of phasal parts of speech is converted to a string of syntatic roles such as subject, governer, direct object, word complement and adverbial modifier. From the string of syntatic roles, a simple sentence pattern, a clausal pattern and a syntatic unit (quasi-clausal pattern) having a syntatically closed subject-predicate relation are searched (English sentence pattern analysis).

Then, a phrasal element, such as a prepositional phrase or an adverbial phrase, is assigned modifying or dependency relation, that is, what noun phrase or verb phrase it modifies or relates to (dependency and modifying relation analysis).

Next, the analyzed English sentence patterns are converted to Japanese sentence frame patterns by referring to conversion rules predetermined for each pattern (tree/list transformation). Finally, the word lexicon and the idiom lexicon are looked up to generate a Japanese sentence which is an output sentence (Japanese sentence generation).

In accordance with a first feature of the present invention, the process of parts of speech analysis for transforming the string of words and idioms to the string of parts of speech is completed in an early stage of the syntatic analysis, preceding phrase structure analysis, and the feedback loops as used in the prior art system are not included. In other words, the parts of speech of all of the words and idioms are determined in the process of parts of speech analysis step and no feedback loops for returning to the process of the part of speech analysis step depending on the result of the phrase structure analysis are included. Accordingly, since the results in the respective steps do not affect the other steps, it is very easy to add the registered patterns for analyses such as the phrase structure analysis.

In accordance with a second feature of the present invention, a part of speech of a multiple parts of speech word is determined by referring to a predetermined part of speech analysis pattern which will be described later. By the use of the part of speech analysis pattern, the part of speech of the word can be rapidly determined and consequently the probability of success in the translation is improved.

In accordance with a third feature of the present invention, a concept of phrasal element which is different from the conventional grammatical clause or phrase is introduced to the syntatic analysis of the clauses and phrases segmented from the string of parts of speech pattern. In accordance with a further feature, the segmented phrasal elements are formed into the string of phrasal parts of speech, which is then transformed to the string of syntatic roles. By introducing the concepts of the phrasal elements and the syntatic roles, a complicated sentence(s) can be correctly translated.

In accordance with a fourth feature of the present invention, the dependency and mcdifying relation analysis step for analyzing the word modified by the phrase or clause is used. By this step, the sentence of complicated modifying relation as shown in FIG. 1B can be correctly translated.

BRIEF DESCRIPTION OF THE DRAWINGS

FIGS. 1A and 1B illustrate prior art translation methods;

FIGS. 4A and 4B show examples of a word lexicon used in the present method;

FIGS. 5A and 5B show examples of a fixed idiom lexicon used in the present method;

FIG. 5C shows an example of a split idiom lexicon used in the present method;

FIG. 6A shows an example of a pattern of a prohibited sequence of parts of speech used in part of the speech analysis in the present method;

FIG. 6B illustrates the part of the speech analysis;

FIG. 7 shows an example of patterns used in phrase structure analysis in the present method;

FIGS. 8A, 8B, 8C and 8D show examples of patterns used in English sentence pattern analysis in the the present method;

FIG. 9 illustrates an input text stream table;

FIG. 10 shows a word/idiom buffer storage;

FIGS. 11A, 11B and 11C show flows of an inflectional ending processing in lexicon retrieval in the present method;

FIGS. 11D and 11E illustrate the inflectional ending processing;

FIG. 15 shows a priority table used in the part of speech analysis processing in the present method;

FIG. 23 shows contents of information stored in an English sentence node table and a Japanese sentence node table;

DESCRIPTION OF PREFERRED EMBODIMENTS

Figure 3:
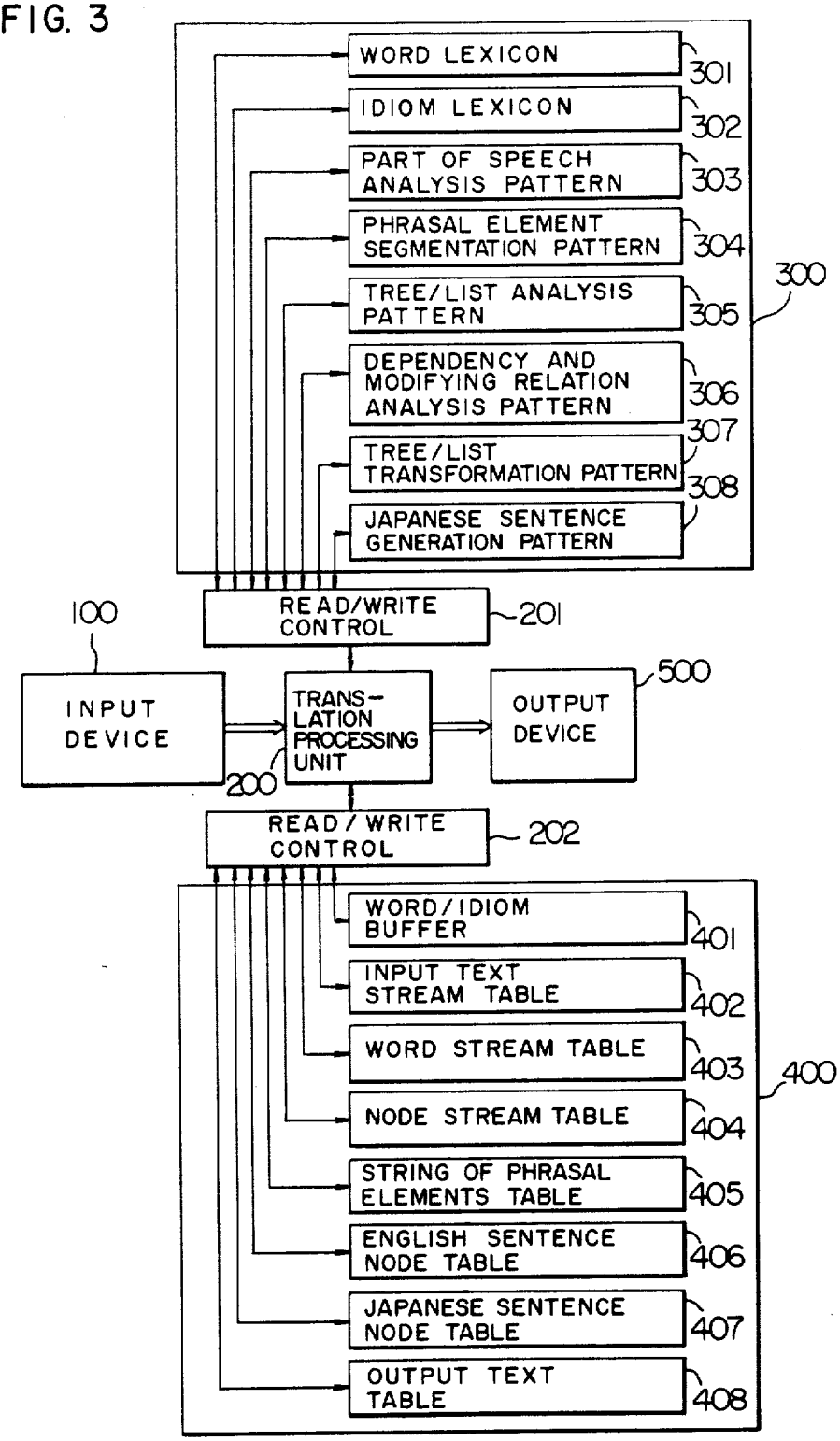
FIG. 3 shows a configuration of an automatic translation system of the present invention.

FIG. 3 shows an overall configuration of the present system. It comprises an input device 100, a translation processing unit 200, a lexicon storage 300, a working storage 400 and an output device 500.

The input device 100 is used to enter an English text. Usually it is a keyboard, although the English text may be put in by any other means. For example, the English text may be recorded on a magnetic tape or a magnetic disc and it may be put into the processing unit 200 through a known magnetic storage control circuit. An English text transmitted through a communication apparatus such as a facsimile may be put into the processing unit 200 through a known communication line control circuit.

The lexicon storage 300 contains a word lexicon, an idiom lexicon and tables which define rules used in the translation processing. Specifically, the storage 300 includes a word lexicon 301, an idiom lexicon 302, a part of speech analysis pattern 303, a phrasal element segmentation pattern 304, a tree/list analysis pattern 305, a dependency and modifying relation analysis pattern 306, a tree/list transformation pattern 307 and a Japanese sentence generation pattern 308.

An internal structure of a storage area of the word lexicon 301 is shown in FIGS. 4A and 4B. Word information records are stored in blocks 1 to N. The word information records each include an index word and a word information representing an attribute of the word. The word information includes the number of idioms which include the word, the start address of the idiom, the number of possible parts of speech of the word, the parts of speech, sub-classes of the parts of speech, attributes of the word in the respective parts of speech, the number of ambiguities, target language equivalents, inflection of the target language equivalents and attached function words of the target language equivalents.

FIG. 4B shows a word information for an English word "STUDY". Six idioms such as "MAKE A STUDY", "UNDER STUDY" and "CASE STUDY" which include the word are registered. The address of the first one of those registered idioms is 76 (see FIG. 5B). Since the word "STUDY" can assume both verb (V) and noun (N), the number of parts of speech is two, and V and N are registered as part of speech 1 and part of speech 2. In the column of the sub-class of the part of speech, detailed information on the part of speech such as intransitive verb/transitive verb, intransitive verb which accompanies a complement (e.g. "get", "look" and "make")/intransitive verb which accompanies a preposition (e.g. "send" and "advertize") are stored.

When the word "STUDY" is used as a verb, it is translated as "benkyō suru" in one case and as "kenkyū suru" in another case. Thus, the number of ambiguities is two, and "benkyō suru" and "kenkyū suru" are registered in the columns of Target Language Equivalent 1 and Target Language Equivalent 2, respectively. It is registered in Conjugations 1 and 2 that "suru", which follows "benkyō" in Target Language Equivalent 1 and "kenkyū" in Target Language Equivalent 2, conjugates in SA-HEN. SA-HEN is one of five kinds of conjunctions of verbs in Japanese. SA-HEN verbs conjugate irregularly in the "SA-column". When the word "STUDY" takes an object (OBJ), "wo" is attached to the OBJ. Therefore, such information is registered in the columns of Attached Function Words 1 and 2 corresponding to Target Language Equivalents 1 and 2.

While not shown in FIG. 4B, similar information is registered for the second part of speech (N).

FIGS. 5A, 5B and 5C show the internal structure of the storage area of the idiom lexicon 302 (FIG. 3).

An idiom information record includes in index word of an idiom and idiom information representing attributes of the idom. The idiom information includes the number of possible parts of speech of the idiom, the parts of speech, sub-classes of the parts of speech, attributes of the idiom in the respective parts of speech, the number of ambiguities of the idiom, target language equivalents, conjugation of the target language equivalents and attached function words.

FIG. 5B shows idiom information on a fixed idiom "MAKE A STUDY OF". Since this idiom forms a verb clause "kenkyū wo suru (STUDY)" the number of parts of speech of 1 and the part of speech U are registered.

FIG. 5C shows an internal structure of a split idiom lexicon, details of which will be explained later.

The column of the number of ambiguities of the idiom stores 1 and the column of Target Language Equivalent 1 stores "kenkyū wo suru". The column of Conjugation 1 stores information which indicates that "suru" of "kenkyū wo suru" of Target Language Equivalent 1 conjugates in the SA-column. The column of Attached Function Word 1 stores information which indicates when the idiom takes an object (OBJ), the target language equivalent is "(OBJ) no kenkyu wo suru" and hence the attached function word "no" is necessary.

FIG. 6A shows an example of a pattern stored in part of speech analysis pattern area 303 in the lexicon storage 300. The part of speech analysis pattern is used when a sentence comprising a string of words of idioms is to be converted to a string of parts of speech of the words or idioms. When the word or idiom has more than one grammatically possible part of speec, the most appropriate one is finally selected based on the relationship with adjacent ones in the string of parts of speech. Patterns of a sequence of parts of speech which are grammatically not to be adopted, that is, patterns of a prohibited sequence of parts of speech are preregistered, and one part of speech is selected out of a number of parts of speech by referring to the patterns. Only six patterns of the prohibited sequence of parts of speech and prohibition release rules are shown in FIG. 6A although several tens of such patterns are prepared in actuality. The patterns may be added, modified or simplified depending on characteristics of input sentences.

In FIG. 6A, "*" in the pattern of the prohibited sequence of parts of speech indicates the position of the word whose part of speech is to be determined. "$F_1$" and "$F_2$" indicate parts of speech of the first and second left-adjacent words to "*", and "$B_1$" and "$B_2$" indicate parts of speech of the first and second right-adjacent words to "*".

A symbol "−V" at the position "*" in item 1 indicates "a part of speech other than verb (V)". Thus, the pattern of the sequence of parts of speech in the item 1 means that "when a word which may be a verb (V) is arranged behind $t_o$, it is determined as a verb (V) and a possibility of another part of speech is zero".

The prohibition release rule indicates that the prohibition by the pattern of the prohibited sequence of parts of speech is released, that is, the arrangement of parts of speech in the pattern of the sequence of parts of speech is permitted. For example, the item 2, indicates that the arrangement of parts of speech of "adjective (ADJ)+verb (V)" is normally prohibited but such an arrangement is permitted when an article (ART) or "be"−verb (BE) is at $F_2$. In other words, it means that for the arrangement of parts of speech of "word other than article (ART) and "be"−verb (BE)+adjective (ADJ)+*", it is determined that the possibility of a verb (V) at the position * is zero.

The item 3 indicates that for the arrangement of parts of speech of "$F_1$ (verb (V))+*", it is determined that the position * cannot assume a verb except when $F_1$ is an "ing"−verb (ING), * is a "be"−verb (BE) or $F_1$ is a word "help".

The item 4 indicates that for the arrangement of parts of speech of "plural pronoun ($PRN_M$)+*", it is determined that the position * cannot assume (verb +s). The item 5 indicates that for the arrangement of parts of speech of "plural noun ($N_M$)+*", it is determined that the position * cannot assume (verb+s). The item 6 denotes that for the arrangement of parts of speech of "locative proper noun ($N_1$)+*", it is determined that the position * cannot assume present tense of verb ($V_P$).

The explanation for other patterns is omitted here, but in essence the patterns of the prohibited sequence of parts of speech similar to those described above are stored as a table in the storage area 303 (FIG. 3).

FIG. 7 shows an example of a pattern stored in phrasal element segmentation pattern area 304 of the lexicon storage 300. The phrasal element segmentation pattern is used when the phrasal elements are segmented from the string of parts of speech comprising the sequence of parts of speech imparted to the words and idioms, and parts of speech are newly assigned to the phrasal elements to generate a string of parts of speech of phrasal elements. The phrasal element is defined as the arrangement of words having the arrangement of parts of speech shown in FIG. 7. It is different from what is called a "phrase" in conventional English grammar. FIG. 7 shows only a part of the phrasal elements. A number of phrasal elements are prepared in actuality.

In FIG. 7, "ADV . . . ADV" indicates one or more ADV (adverb)'s. Item 1 indicates that for the sequence of parts of speech of "a single adverb (ADV)" or "adverb (ADV) +. . . +adverb (ADV)", the entire arrangement is segmented as a phrasal element and an adverb is imparted thereto as the part of speech of the phrasal element. Item 2 indicates that for the sequence of "preposition (PREP)+noun (N)" or "preposition (PREP)+noun (N)+. . . +noun (N), the prenal phrasal part of speech is imparted to the phrasal element. Item 3 indicates that for the sequence of "auxiliary verb (AUX)+verb (V)" or "auxiliary verb (AUX)+. . . +auxiliary verb (AUX)+verb (V), the entire sequence is segmented as a phrasal element and a verb (V) is assigned thereto as a part of speech of the phrasal element. Items 4, 5 and 6, also, indicate the segmentations and assignments in similar manner.

The tree/list analysis pattern storage area 305 of the lexicon storage 300 contains four tables, a verb pattern table, a conjunction pattern table, a clause pattern table and a sentence pattern table.

FIG. 8A shows an example of the verb pattern table. It is used to determine syntatic roles of modes which are right-adjacent and left-adjacent to a node including a verb, based on a type number of the verb. The type number of the verb is determined by looking up the word lexicon or the idiom lexicon. Table 1B shows the type numbers of the verbs, and verb's government patterns of nominal phrases.

TABLE 1A

| SYMBOL | PART OF SPEECH | CATEGORY OF CORRESPONDING NODE |
|---|---|---|
| PRN | Pronoun | W |
| N | Noun, Compound Noun | W, P |
| ADJ | Adjective, Compound Adjective | W, P |
| CNJ | Conjunction, Quasi-Conjunction | W |
| V | Verb, Compound Verb (other than the following three columns) | W |
| TOV | Verb, Compound Verb (To infinitive type) | W |
| ENV | Verb, Compound Verb (post participle type) | W |
| INGV | Verb, Compound Verb (progressive type) | W |
| AUX | Auxiliary Verb | W |
| ADV | Adverb, Compound Adverb | W, P |
| PREP | Preposition, Compound Preposition | W |
| PRENAL | Prenal (Preposition + (compound) noun type) | P, Q |
| ART | Article | W |
| INT | Interjection | W |
| NOT | Negative | W |
| COM | Comma | W |
| PRD | Period | W |
| . . . | . . . | . . . |

FIG. 8B shows an example of the conjunction pattern table. It is used to determine a syntatic role of a node including a conjunction based on syntatic roles of adjacent nodes thereto.

FIG. 8C shows an example of the clause pattern table. It is used to determine a clause pattern based on syntatic role pattern of a string of nodes between conjunctions and/or punctuations.

Figures 8D, 9, 10:
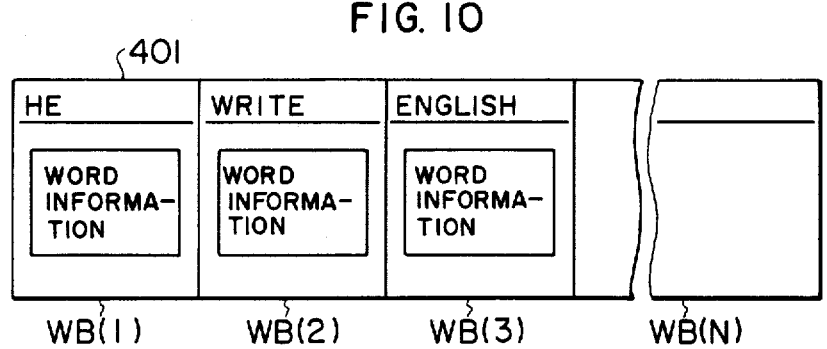

FIG. 8D shows an example of the sentence pattern. It is used to determine a sentence pattern (skeleton pattern) based on an arrangement of clause patterns.

Details of the respective pattern tables will be explained later. Symbols used in FIGS. 8A, 8C and 8D will be explained later in conjunction with FIG. 20B. The lexicon storage 300 further includes storage areas for a dependency and modifying relation analysis pattern 306 for determining the word which an adjective, adverb, or phrase modifies, a pattern 307 used to transform tree/list and a pattern 308 used to generate a Japanese sentence. Those patterns will be explained later.

As described above, the lexicon storage 300 contains the word lexicon and the idiom lexicon as well as various rule patterns. Read/write of the information from/to the storage 300 is carried out by the read/write control circuit 201.

Figure 2:
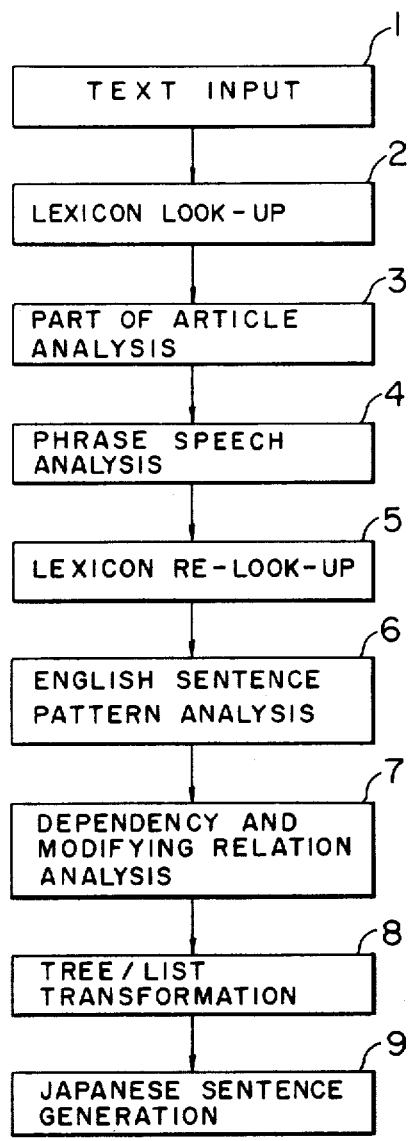
FIG. 2 illustrates a concept of an automatic translation method of the present invention.

The working storage 400 stores the tables necessary in the steps shown in FIG. 2. It includes a buffer table area 401 for temporarily storing the read word and idiom information, an area 402 for storing an input text stream table, an area 403 for storing a word stream table, an area 404 for storing a node stream table, an area 405 for storing a string of phasal elements, an area 406 for storing a string of English sentence nodes, an area 407 for storing a string of Japanese sentence nodes, and an area 408 for storing an output text. Details of those tables will be described later.

Read/write of the information of the working storage 400 is carried out by the read/write control circuit 202 in accordance with an instruction from the translation processing unit 200.

As will be explained later in more detail, the translation processing unit 200 contains a program for carrying out the steps shown in FIG. 2 and translates the input English text to a Japanese sentence by referring to the information stored in the lexicon storage 300 and using the storage 400 as a working area.

The output device 500 may be a printer or display for printing or displaying the output Japanese sentence.

The lexicon storage 300 may be a disc storage and the working storage 400 may be a core storage or memory, although not limited thereto. Those storages may be separate from the processing unit or incorporated in the processing unit.

The processing steps of the present method will now be explained in detail.

- (1) Text Input

In the text input step, the English text inputted by the input device 100 (FIG. 2) is sequentially written in the input text stream area 402 in the working storage. An example of the English text is shown in FIG. 9. When the English text is inputted by the input device 100 such as a keyboard, it is converted to coded signals corresponding to the alphabet and the coded signals are stored in the input text stream area 402.

(2) Lexicon Look-up

After the text input step, the lexicon look-up step is carried out. In this step, the word lexicon 301 is looked up in the sequence of occurrence of the words in the input text stored in the input text stream area 402, and the word information of the corresponding words are sequentially stored in the word/idiom buffer storage area 401 in the working storage 400. For example, for the text shown in FIG. 9, word information having an index word "HE" is first stored in address WB(1) of the storage area 401 as shown in FIG. 10. The next word "WROTE" is an irregular verb and it is preregistered in the word lexicon 301. The word information therefor contains a pointer to "WRITE" (start address of "WRITE") and irregularity information (wrote is a past tense of write). Thus, when the word "WROTE" is looked up in the lexicon, the word information having the index word "WRITE" is read, and the irregularity information is added to the word information. Then, the word information is stored in address WB(2) of the memory area 401. Subsequently, the words "ENGLISH", "VERY", . . . are sequentially looked up in the lexicon.

In this manner, the same information as the content of the word lexicon is temporarily written in the word/idiom buffer storage area 401 because the working storage 400 is usually a fast accessable storage such as a core storage and hence the lexicon look-up in the steps of part of speech analysis, dependency and modifying relation analysis and Japanese sentence generation can be carried out fast. Instead of using the word/idiom buffer storage 401, the word lexicon 301 and the idiom lexicon 302 may be directly looked up in the respective steps.

In the lexicon look-up step, inflectional ending of words is processed and the idioms are detected. These processes are now explained in detail.

In the inflectional ending processing, a word having an inflectional ending such as conjugation, plural inflection or degree inflection is transformed to a stem, which is then looked up in the word lexicon 301 and the idiom lexicon 302. The retrieved content plus the inflectional ending information are then stored in the word/idiom buffer storage area 401. By this processing, the word lexicon or idiom lexicon look-up in the subsequent part of speech analysis step can be carried out by referring to the stem index word. Thus, it is not necessary to preregister the word information of the inflectional ending in the lexicon and hence the capacity of the lexicon storage can be reduced.

By way of example, let us consider the word "STUDIES" which is a plural form of a noun and a third person singular form of a verb to explain a transform step to a stem. The stem transform steps for other inflectional words are similarly carried out.

Figure 11A:
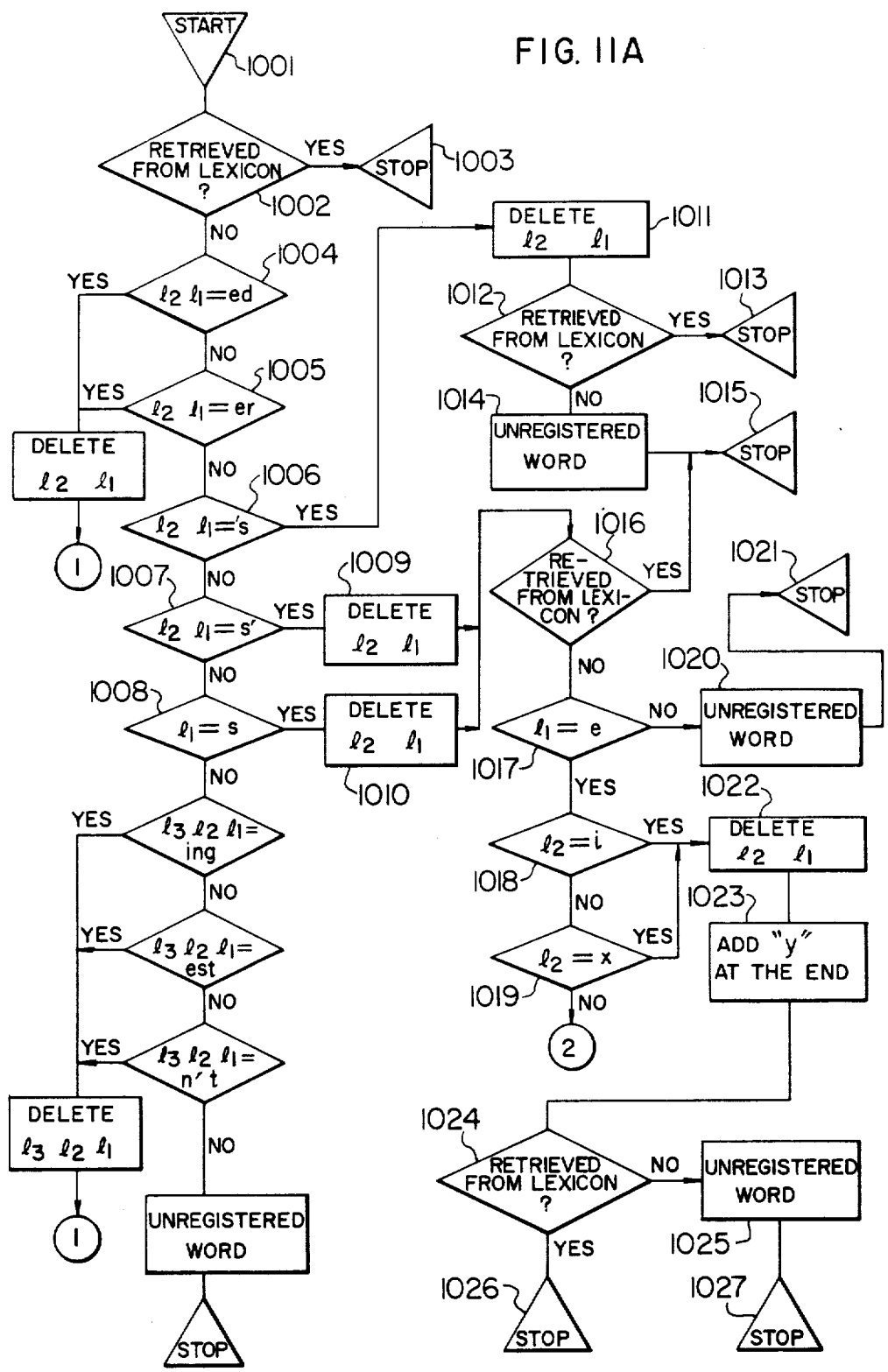
Figure 11B:
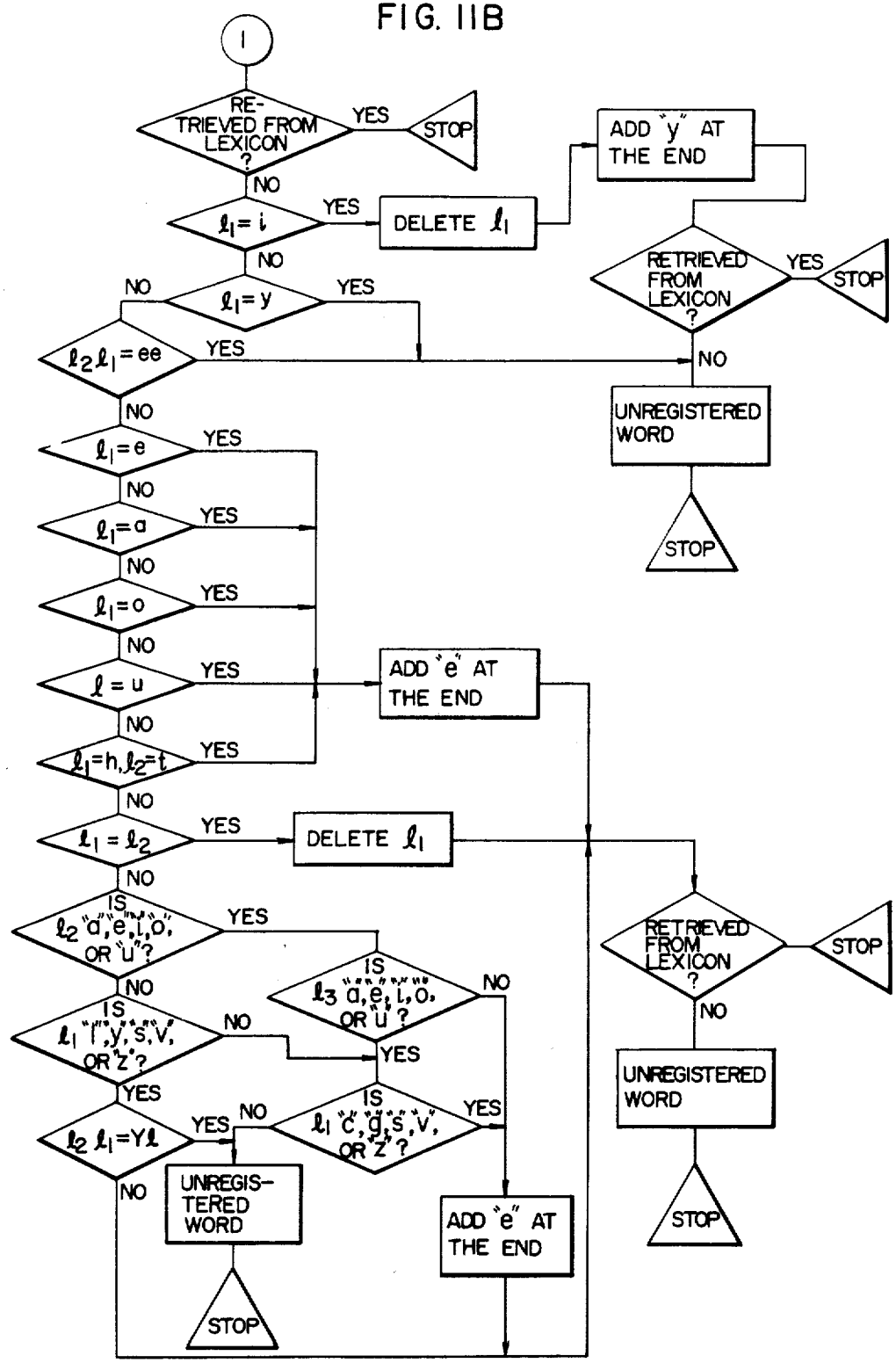

The word to be processed is assigned with codes $l_1$, $l_2$, $l_3$, . . . to each of characters constituting the word. For example, for the word "STUDIES", $l_1$ is assigned to the end character "S", $l_2$ is assigned to the character "E", $l_3$ is assigned to the character "I" and so on, as shown in FIG. 11D. After a processing of "delete $l_2$, $l_1$" shown in a step 1011 of FIG. 11A, the characters of the word are assigned with the codes as shown in FIG. 11E. That is, the two ending characters are deleted and the codes are reassigned.

In a step 1002, the lexicon is looked up and if the word is retrieved the process ends (step 1003), and if the word is not retrieved the process goes to a step 1004. In steps 1004, 1005, 1006, 1007 and 1008, it is checked to see if the word includes the inflectional ending. In the present example, the decision in the step 1008 is YES and the process goes to a step 1010 where the end character "S" of the word "STUDIES" is deleted resulting in a word "STUDIE". In a step 1016, the lexicon is again looked up. For a simple plural form of the noun, it is retrieved from the lexicon in many cases (for example, a word "LIKES"). In the present example, the process further goes to a step 1017 where it is checked to see if the end character is "E". Since the decision is YES in the present example, the process goes to a step 1018. The process further goes to a step 1022 where the characters $l_2$ and $l_1$, that is, "I" and "E" are deleted resulting in "STUD". In a step 1023, a character "Y" is added to result in a stem "STUDY" and the lexicon is again looked up in a step 1024. If the word is not retrieved in the step 1024, it is determined as a non-registered word (step 1025).

As the word "STUDY" is retrieved from the lexicon through the above steps, the word information thereof is read and the word information plus the inflectional ending information (plural form of noun and third person singular form of verb) are written in the word-/idiom buffer storage area 401.

Figure 12:
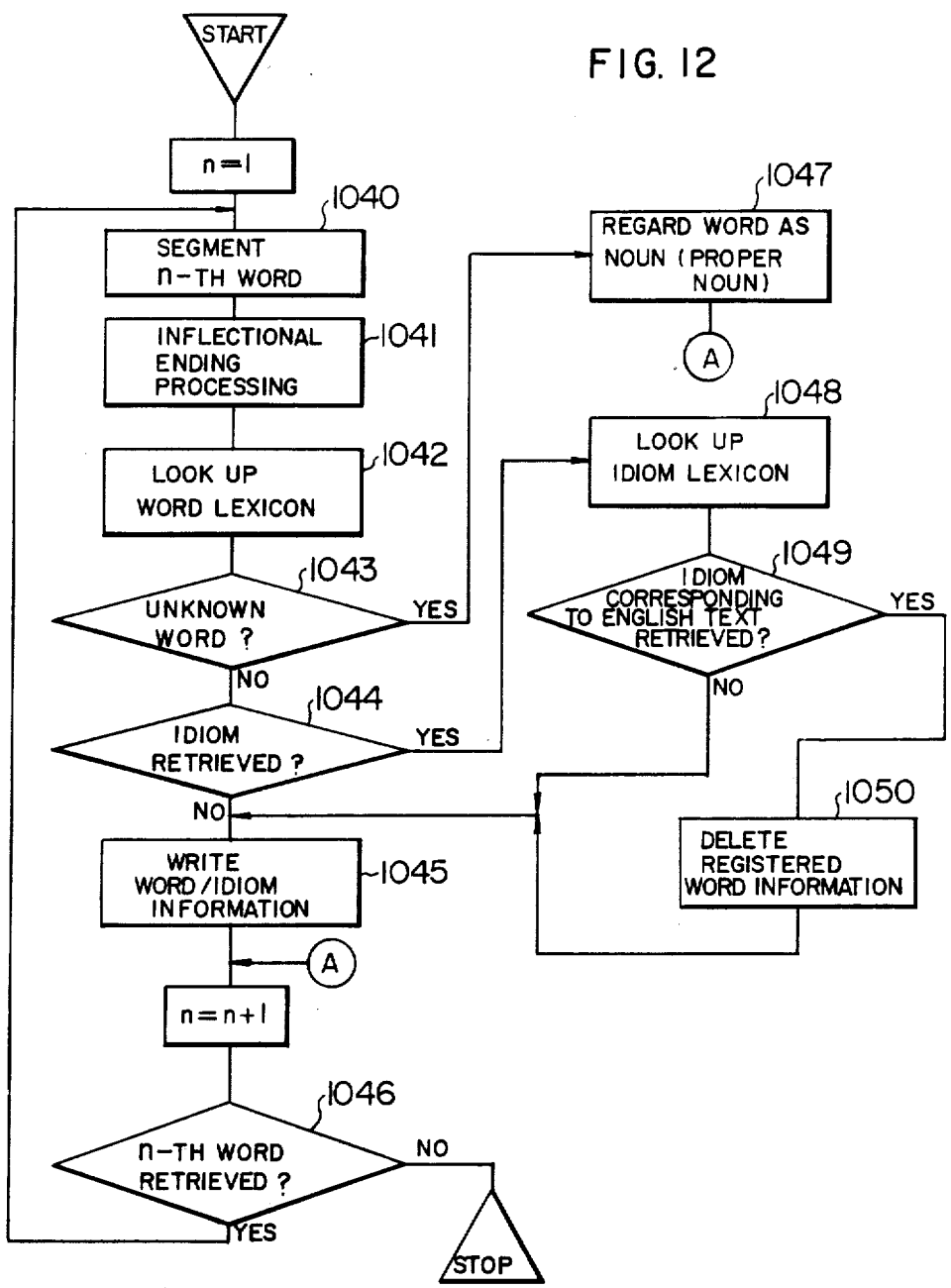
FIG. 12 shows a flow of the lexicon retrieval processing in the present method.

Referring to FIG. 12, the detection of an idiom comprising a sequence of words in the English text is explained. The idiom is defined as a combination of more than one word which has a lingustic meaning.

By way of example, let us assume that an idiom "MAKE A STUDY" is detected. The steps for storing it in the word/idiom buffer storage area 401 is now explained. In a step 1040, a word is segmented and the inflectional ending process described above is carried out in a step 1041. In a step 1042, the word lexicon is looked up. For the words "MAKE" and "A", the index words of the word lexicon 301 are retrieved in the same manner as described above and the word information is sequentially stored in the word/idiom buffer storage area 401. In a step 1043, it is checked to see if the word is an unknown word which is not registered in the lexicon. If it is not registered, the process goes to a step 1047 where it is determined as a proper noun. Then, word lexicon 301 is looked up to retrieve the word "STUDY" next to the word "A". As shown in FIG. 4B, six idioms which include the word "STUDY" are included (step 1044). Thus, the retrieval of the index words of the idioms is started from the start address (76) of the corresponding idiom areas (step 1048). As shown in FIG. 5B, the idioms "MAKE A STUDY OF", "UNDER STUDY" and etc. are detected as the idioms which include the word "STUDY". Of those idioms, the idiom "MAKE A STUDY OF" corresponds to the idiom in the input text (step 1049). If it is determined that no corresponding idiom is included, the word "STUDY" is regarded as a simple word and the word information of "STUDY" is stored in the buffer storage area 401 in the same manner as described above (step 1045). If it is determined that more than one idiom corresponds to the input text, the longest idiom is selected as the corresponding idiom. For example, when both idioms "MAKE A STUDY" and "MAKE A STUDY OF" correspond, the latter is selected.

In the present example, the input text corresponds to the idiom "MAKE A STUDY OF". In this case, invalid marks are assigned to the word information for the words "MAKE" and "A" stored in the word/idiom buffer storage area 401 or the word information are deleted (step 1050). Thereafter, the idiom information for the idiom "MAKE A STUDY OF" is stored in the word/idiom buffer storage area 401 (step 1045).

Through the above steps, all of the words and idioms appearing in the input English text are eventually stored in the buffer storage area 401 in the sequence of appearance.

In the illustrated embodiment, the unknown words are regarded as the proper nouns for the sake of simplicity. However, the parts of speech of the unknown words can be determined more exactly. The exact determination of the parts of speech of the unknown words can be attained by executing the part of speech analysis steps by the prohibited table look-up described above.

(3) Part of Speech Analysis

Figure 13:
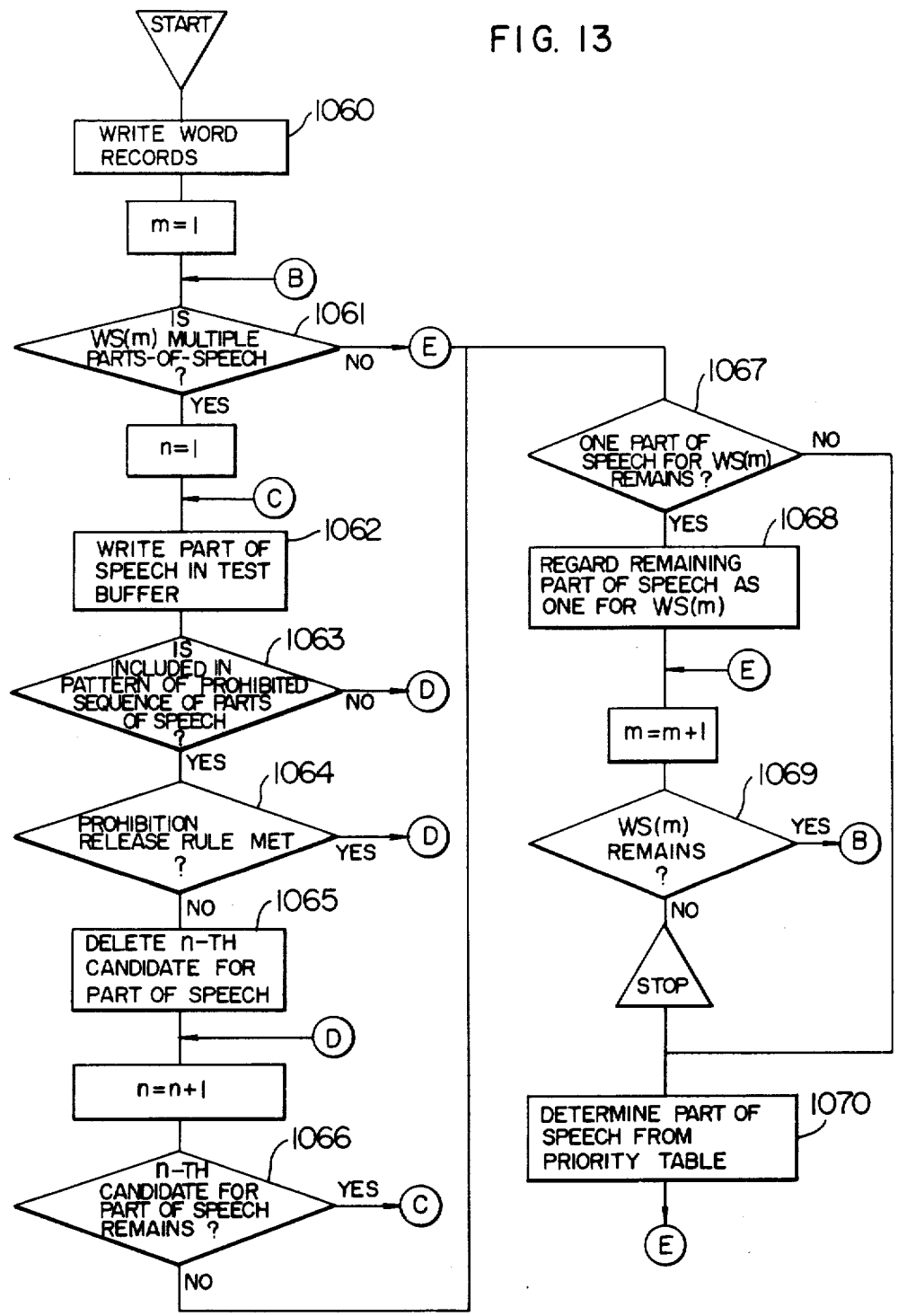
FIG. 13 shows a flow of the part of speech analysis processing in the present method.

In the part of speech analysis processing, the parts of speech are assigned to each of the words and idioms stored in the word/idiom buffer storage area 401, in accordance with a flow chart shown in FIG. 13.

In step 1060, the word/idiom buffer storage area 401 is sequentially scanned in the sequence of WB(1), WB(2), WB(3), . . . to read out the parts of speech of the words and idioms, the sub-classes of the parts of speech and the attribute information, which are then sequentially stored in the word stream table area 403. A part of the parts of speech and their codes are shown in Table 1B.

TABLE 1B

| TYPE OF VERB | GOVERNMENT PATTERN, WHEN VERB IS GOVERNOR (GOV) | "—" INDICATES A PORTION IN THE NEXT WORD. SUBJECT AT THE BEGINNING OF PATTERN IS OMITTED. WORD IN ( ) ARE NOT ALWAYS NECESSARY. < > INDICATES PART OF SPEECH OF WORD. Δ INDICATE THAT WORD IS SEGMENTED IMMEDIATELY BEFORE Δ. | EXAMPLES OF VERB (GOV) |
|---|---|---|---|
| $V_1$ | GOV<br>GOV + COMP; COV = \<BEV\> | | be |
| $V_2$ | GOV + COMP; GOV ≠ \<BEV\><br>(ALL THE FOLLOWING GOV ≠\<BE\>)<br>$\left\{ \begin{array}{c} <THERE> \\ <IT> \end{array} \right\}$ + GOV + COMP | | get, look, make, come, become |
| $V_3$ | GOV (+ \<ADVAL\>) | | rise, walk, fall<br>look |
| $V_4$ | GOV + \<PREP\> | | |
| $V_5$ | GOV + (\<PREP\> + \<IT\>) + Δ . . .<br>GOV + (\<PREP\>) + Δ . . . | | agree, see,<br>decide |
| $V_6$ | GOV + \<TOV\> | | stop, prefer,<br>want, like, study |
| $V_7$ | GOV + OBJ | | study |
| $V_8$ | GOV + Δ\<THAT\> + . . .<br>GOV + \<WH\> + \<TOV\><br>GOV (+ \<WH\>) + Δ . . . | | suppose, know,<br>say, tell, show |
| $V_9$ | GOV + IOBJ + $\left\{ \begin{array}{c} <WH> + <TOV> \\ Δ(<WH> + . . .) \end{array} \right\}$ | | snow, tell |
| $V_{10}$ | GOV + IOBJ + DOBJ<br>GOV + OBJ + $\left\{ \begin{array}{c} COMP \end{array} \right\}$ | | make |

TABLE 1B-continued

| TYPE OF VERB | GOVERNMENT PATTERN, WHEN VERB IS GOVERNOR (GOV) | "—" INDICATES A PORTION IN THE NEXT WORD. SUBJECT AT THE BEGINNING OF PATTERN IS OMITTED. WORD IN ( ) ARE NOT ALWAYS NECESSARY. < >INDICATES PART OF SPEECH OF WORD. Δ INDICATE THAT WORD IS SEGMENTED IMMEDIATELY BEFORE Δ. | EXAMPLES OF VERB (GOV) |
|---|---|---|---|
| $V_{11}$ | GOV + OBJ + { <N> COMP <ADJ> } | | paint, regard |
| $V_{12}$ | GOV + { OBJ <IT> } + <PREP> + { <N> <ING>(+ <N>) } | | ... read, congratulate bring |
| $V_{13}$ | GOV + OBJ + { <ADV> ADVAL } | | keep, put |
| $V_{14}$ | GOV + ADVAL + OBJ | | |
| $V_{15}$ | GOV + OBJ (+ <NOT>) + TOV | | bring, know |
| | GOV + OBJ + { TOV INGV ENV <TO> + <BE> + { <ADJ> <N> } } | | full, have, see, gues, think |
| | GOV + <IT>  { <ADV> <N> } + ... Δ | | |
| $V_{17}$ | GOV + [ ( { <ADJ> <N> } ) + <TOV> (<TO> + <BE>) + { <ADJ> <N> } ] | | appear, seem, prove |

Figure 14A:
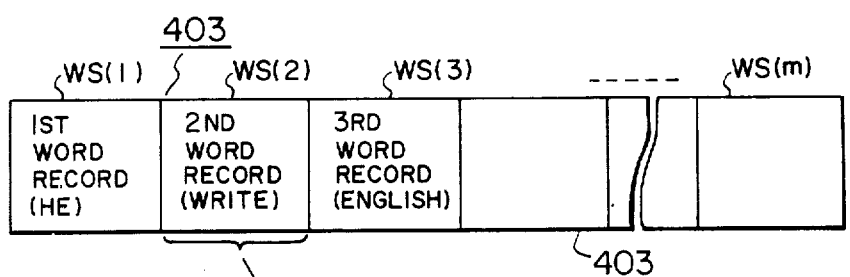
FIGS. 14A and 14B show contents of information stored in a word stream table in the present method.
Figure 14B:
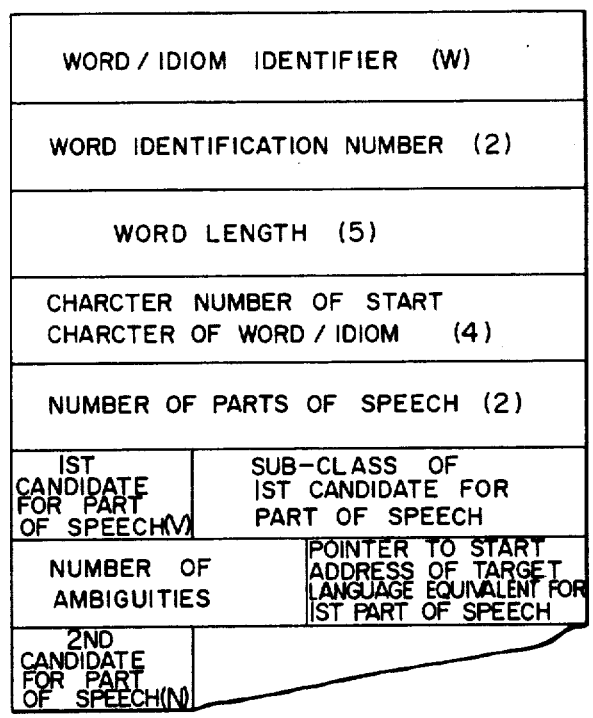

FIGS. 14A and 14B show an internal structure of the word stream table. Each of the words and idioms has a word record which includes information as shown in FIG. 14B. By way of example, the word record for the word "WRITE" is explained. A word/idiom identifier has information (W) indicating a word. A word identification number indicates the number of times at which the word appears in the text stream table (FIG. 9). In the present example, it includes "2". A word length indicates the number of characters of the word or idiom. For the word "WRITE", "5" is written. A character number of a start character indicates an address (4) on the text stream table 402 (FIG. 9) at which the start character "W" of the word "WRITE" is located. The number of parts of speech include "2" in the present example because the word "WRITE" assumes a noun (N) and a verb (V). A subclass of the part of speech, the number of ambiguities and a pointer to a start address of a target language equivalent (FIG. 4B) for the corresponding part of speech are also stored.

Referring back to FIG. 13, in a step 1061, it is checked if a word at an address WS(m) is a multiple parts-of-speech. As is well known, the word or idiom frequently has multiple parts of speech. In this case, must appropriate one of the parts of speech should be selected. (This processing is called disambigulation of multiple parts-of-speech). In order to carry out the disambigulation of multiple parts-of-speech, the parts of speech analysis pattern (FIG. 6A) stored in the lexicon storage 300 is used in accordance with the present method. If the word or idiom has multiple parts of speech, one of the parts of speech is written in a test buffer storage (which is a portion of the working storage and not shown) in a step 1062. In a step 1063, the parts of speech written in the test buffer storage is compared with the patterns of prohibited sequence of parts of speech shown in FIG. 6A to search for a corresponding pattern. By way of example, the disambigulation of the multiple parts-of-speech for the word "ENGLISH" in the input text shown in FIG. 9 is explained. The word "ENGLISH" assumes two par parts of speech, noun (N) and adjective (ADJ). The parts of speech for two left-adjacent words "HE" and "WROTE" and two right-adjacent words "VERY" and "SLOWLY", that is, pronoun (PRN), verb ($V_7$), adverb (ADV) and adverb (ADV) are written in the test buffer. This is shown in FIG. 6B. A suffix 7 of the verb $V_7$ indicates a subclass of the part of speech (verb) and it indicates a transitive verb which accompanies an object. After the adjective (ADJ) has been written at the position * in the test buffer (FIG. 6B), it is compared with the patterns of the prohibited sequence of parts of speech shown in FIG. 6A. As a result, the pattern of the sequence of parts of speech shown in FIG. 6B is equal to the pattern 7 of FIG. 6A and hence it is determined that the pattern (—, $V_7$, ADJ, — —) is prohibited. Accordingly, it is determined that the word "ENGLISH" cannot be an adjective in this sentence. Then, the noun (N) is written at the position * in the test buffer (FIG. 6B) and it is again compared with the patterns of the prohibited sequence of parts of speech. In this case, it is finally determined that it does not correspond to any of the prohibited patterns and hence the word "ENGLISH" is a noun.

Referring again to FIG. 13, in a step 1064, it is checked to see if the prohibition release rules 1 and 2 shown in FIG. 6A are met.

If the part of speech under consideration corresponds to one of the patterns of the prohibited sequence of parts of speech and does not meet the prohibition release rules, it is deleted from candidates for the appropriate part of speech (step 1065). If more than one cadidate for the part of speech remains, the process goes back to the step 1062 to repeat similar steps. It is then checked to see if only the last one of the parts of speech remains (step 1067), and if the decision is YES, the remaining part of speech is determined as the part of speech of the word or idiom at the address WS(m) (step 1069).

When more than one part of speech finally remains, the process goes to a step 1070 where the parts of speech are determined from a priority table shown in FIG. 15. When two parts of speech, for example, the adjective (ADJ) and the noun (N) remain, the third row having ADJ as an index word and the second row having N as an index word are scanned and it is determined that ADJ has a higher priority than N (ADJ>N). As a result, ADJ is selected.

One example of the disambigulation of multiple parts-of-speech has been described thus far. In order to improve the efficiency and probability of success of this processing, the following steps may be carried out.

(i) When the candidate part of speech is written in the test buffer storage, it may be set in the order of frequency of occurrence so that the efficiency of the processing is improved.

(ii) While the priority table shown in FIG. 15 has been explained to be used when more than one part of speech finally remains, the table of FIG. 15 may be used for all of the candidates for the part of speech after all of the candidates have been finally deleted to select the highest priority one.

(4) Phrase Structure Analysis

In the phrase structure analysis processing, a phrasal element is segmented from a string of parts of speech which is constructed by assigning only one part of speech to each word or idiom in the English input text and a part of speech is assigned to the segmented phrasal element to generate a string of phrasal elements having parts of speech assigned thereto (string of parts of speech of phrasal elements). As described above, the phrasal element is different from a phrase in the English grammatical sense and it means a combination of words and/or idioms which is a minimum unit with a linguistic meaning. For example, the phrasal element may be noun+noun, auxiliary verb+verb, article+noun, adjective+noun or preposition+noun.

In the conventional English grammar, a phrase is vaguely defined and it is not possible to uniquely determine what part of a given English text is the phrase. For example, a phrasal element which serves as a governor and a phrasal element which serves as an object of the governor are phrases respectively and the combination thereof is also a phrase in accordance with the conventional English grammer. More specifically, "auxiliary verb+verb+article+adjective+noun" (will have a beautiful girl) is a phrase (verb phrase) in the English grammar but it is not a phrasal element in the definition of the present invention. "Auxiliary verb +verb" (will have) and "article+adjective+noun" (a beautiful girl) are phrasal elements.

A phrase comprising a number of interlinked phrases and phrases having common words to each other are defined as phrases in the conventional English grammar.

On the other hand, a governor and an object therefor are separate phrasal elements in the present invention. The phrasal element in the present invention is defined uniquely, and in an non-overlapped manner for a given English text. Such a combination of words is used as a base data for tree/list analysis and tree/list transformation.

In this manner, the phrase structure analysis processing is simplified and clarified and the subsequent tree/list transformation processing and Japanese sentence generation processing can be clearly separated.

Figure 16:
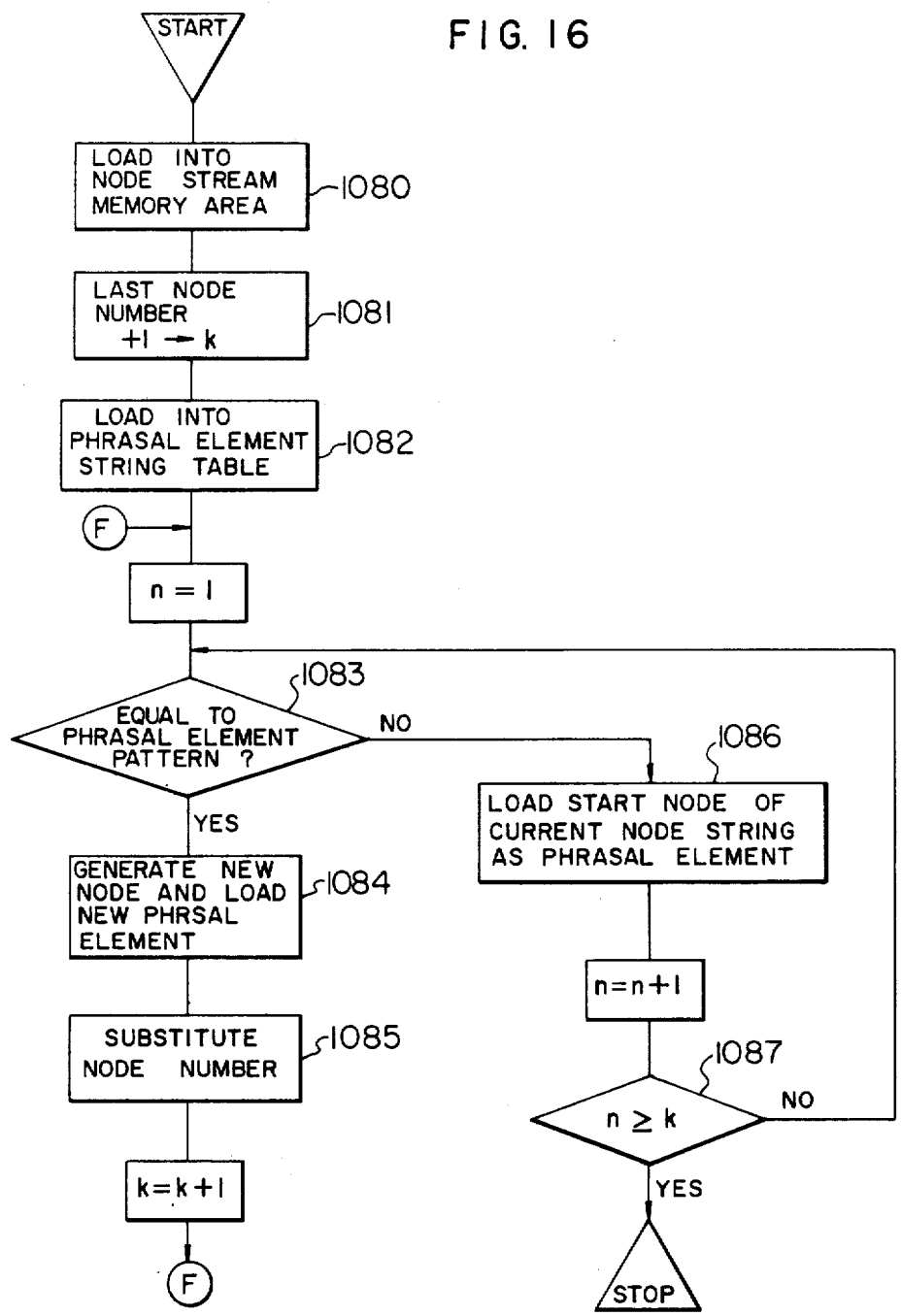
FIG. 16 shows a flow of the phrase structure analysis processing in the present method.
Figure 17:
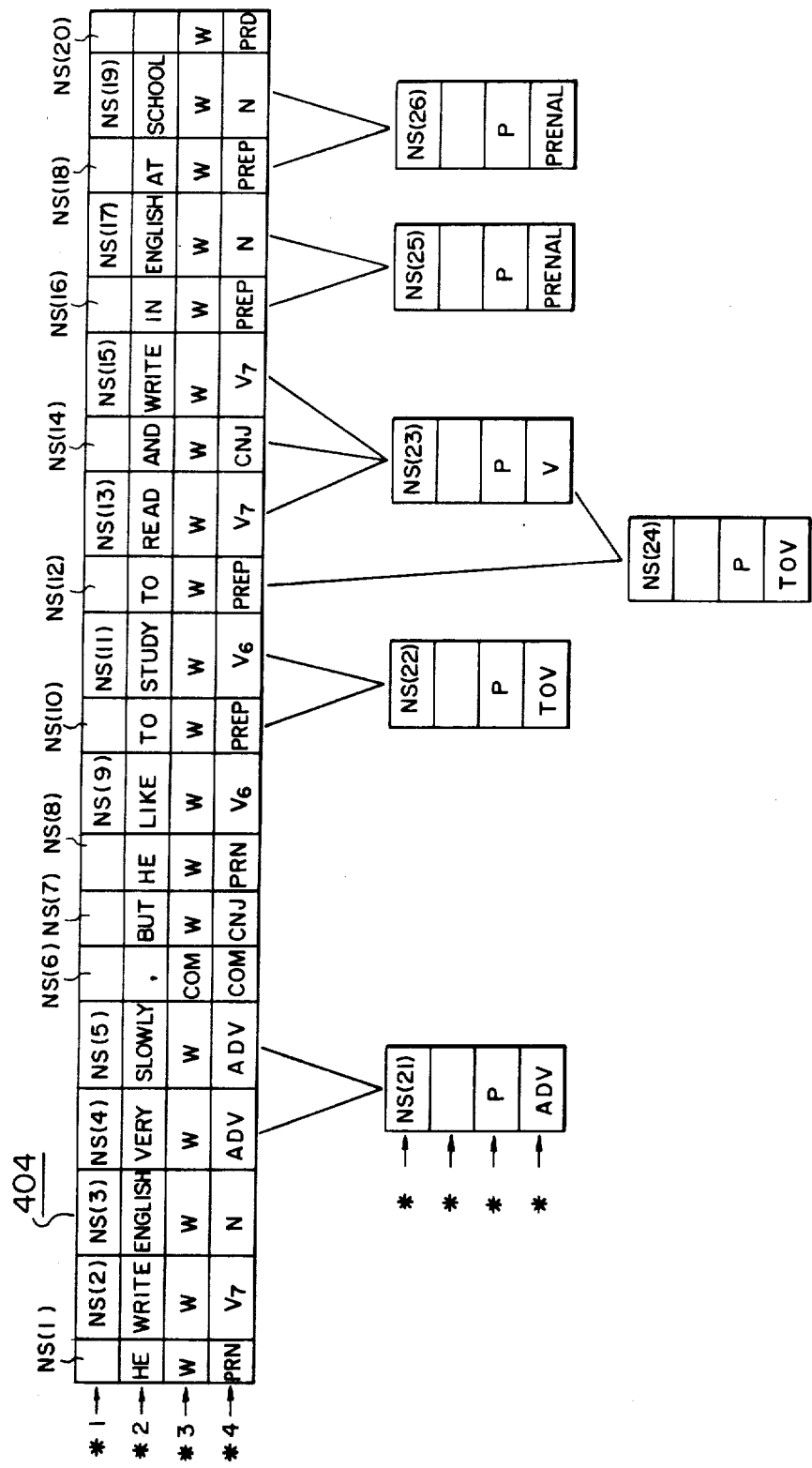
FIG. 17 shows a content of information stored in a node stream table in the present method.

FIG. 16 shows a flow of the phrase structure analysis processing. In a step 1080, word records of words and idioms stored in the word stream storage area 403 are written in the node stream storage area 404. FIG. 17 shows a content of the node stream storage area 404, in which NS(1), NS(2), ... NS(20) shown in a row *1 indicate node numbers. A row *2 stores corresponding words. In actuality, it stores information on pointers to the word stream table (FIGS. 14A and 14B). A row *3 stores information on categories of the nodes, that is, word (W), phrasal element (P), clause (C), quasi-clause (Q) and sentence (S). A row *4 stores part of speech information and sub-class information of the part of speech.

A phrasal element is segmented based on the information loaded in the node stream memory area 404. In a step 1081, k is set to a number equal to the last node number plus one. Thus, an input English text comprises (k−1) words and idioms including comma and period. In a step 1082, the node numbers NS(1), NS(2), ... NS(k−1) are loaded to the phrasal element string table area 405. In a step 1083, the node numbers n to (k−1) of the node numbers loaded in the phrasal element string table are designated by $C_1, C_2, C_3, \ldots C_N$. The number n has been initialized to one immediately before the repetition. For the patterns of the string of parts of speech for the nodes $NS(C_1), NS(C_2), \ldots$, it is checked to see if a pattern corresponding to a pattern of parts of speech to be segmented as a phrasal element shown in FIG. 7A is included. For example, when n=1, a string of parts of speech PRN, V, N, ... of a sentence starting with "HE" is compared with the registered patterns, and when n=2, a string of parts of speech V, N, ADV, ... of a sentence starting with "WRITE" is compared with the registered patterns. If the string of parts of speech is equal to more than one pattern of the parts of speech shown in FIG. 7A, a longer one is segmented as the phrasal element. In the English text shown in FIG. 17, when n=4, a string of parts of speech ADV, ADV, COM, ... for a sentence starting with "VERY" is equal to the registered pattern #1 shown in FIG. 7A and hence "VERY SLOWLY" is selected as a phrasal element. Similarly, "TO STUDY", "TO READ AND WRITE", "IN ENGLISH" and "AT SCHOOL" are selected as phrasal elements.

In a step 1084, a sequence of nodes which correspond to the registered patterns of parts of speech for the phrasal elements, that is, $NS(C_1), NS(C_2), \ldots$ is formed into a new node NS(k), which is then loaded in the phrasal element string table.

The newly generated node NS(k) is called the immediately dominating node (parent node) of the phrasal elements. In the text shown in FIG. 17, NS(4) and NS(5) are combined to generate a new node NS(21). An adverb (ADV) is imparted to the phrasal element of the node in accordance with the table shown in FIG. 7A. A new node number is imparted to the newly generated parent node and the daughter nodes' numbers are also registered. Thus, information stored in the memory area for the node NS(21) indcates that the node NS(21) is formed by the nodes NS(4) and NS(5), the node NS(21) is a phrasal element and a part of speech of the phrasal element is adverb (ADV).

On the other hand, if the decision in the step 1083 is NO, the process goes to a step 1086 where the node NS(C₁) per se is regarded as a phrasal element. In this case, a new mode is not generated.

In a step 1085, the newly generated parent node is replaced by the daughter nodes to modify the phrasal element string table. Initially, the phrasal element string table includes the nodes in the sequence of 1, 2, 3, 4, . . . 19, 20. By the generation of the new phrasal element, the sequence is rearranged in 1, 2, 3, 21, 6, 7, 8, 9, 22, 24, 25, 26, 20 (FIG. 17).

When the English text is "Do you know . . . ", for example, "Do" and "know" are phrasal elements. Accordingly, a phrasal element is not always formed by a plurality of words in contiguous positions.

(5) Idion Lexicon Re-Look-up

After the phrase structure analysis processing, the idiom lexicon is looked up again for the following reason.

There are two types of idioms or sequence of words which appear in the English text. One type of idiom comprises a fixed sequence of words such as "MAKE USE OF", and an idiom of the other type a becomes completed idiom by filling the blank (∼) with a word, phrase or clause having a certain characteristic such as "TAKE ∼ INTO CONSIDERATION". For the sake of convenience of explanation, the former is called a fixed idiom and the latter is called a split idiom. A noun phrase or noun clause is taken into the portion ∼. As shown in FIG. 5C, the idiom lexicon stores "TAKE !N INTO CONSIDERATION" where "N" is a symbol of part of speech for the noun, and "!" is a symbol which is used to distinguish from the usual spelling of a word.

As described above, the look-up for the fixed idiom has been completed in the lexicon look-up step but the idiom lexicon has to be looked up again after the completion of the phrase structure analysis in order to process the split idiom.

Figure 18:
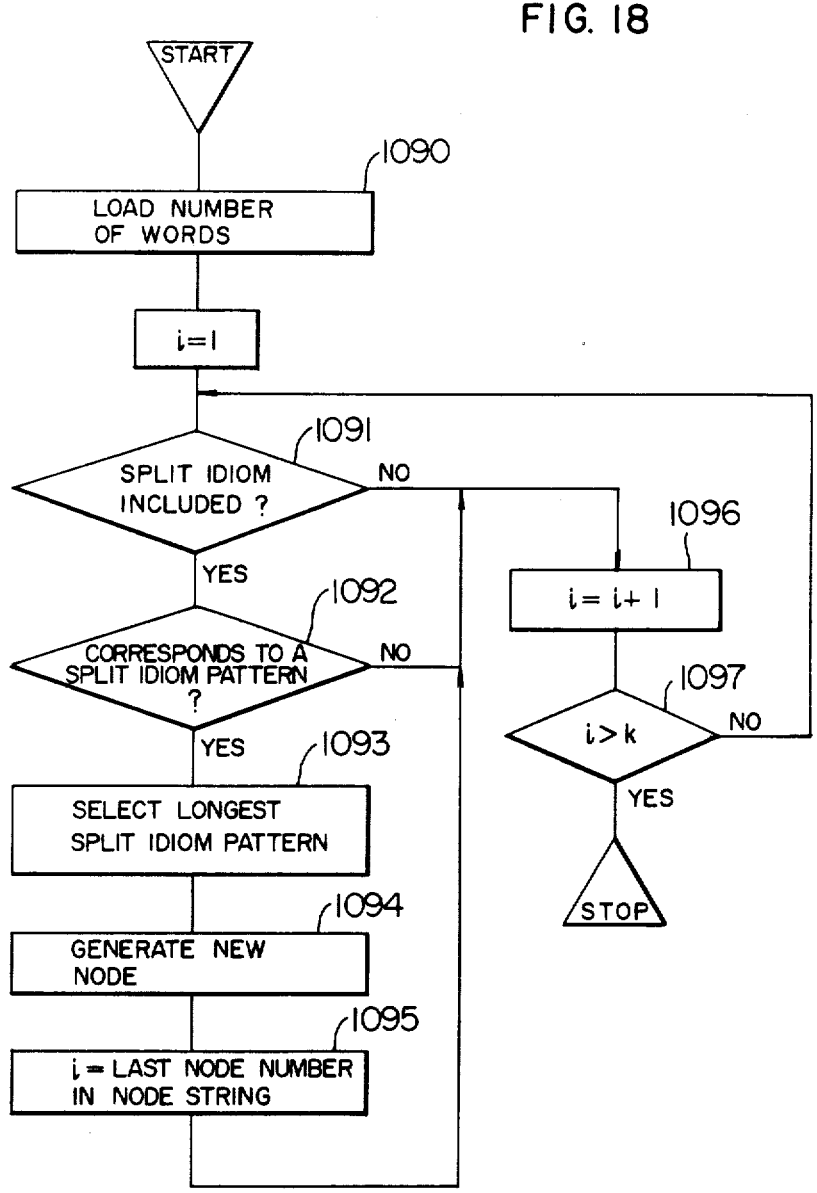
FIG. 18 shows a flow of the split idiom lexicon retrieval processing in the present method.

FIG. 18 shows steps for the idiom lexicon relook-up. In a step 1090, the number k of words of the input English text is loaded into an appropriate area of the working storage 400. In a step 1091, it is checked to see if a split idiom having a word at node NS(i) (FIG. 17) as an index word is included, where i has been initialized to one immediately before the repetition. If it is not included, the process goes to steps 1096 and 1097 and the same decision step is repeated until the count reaches k.

For example, when the input English text is "THE TEACHER TAKES HIS GOOD ATTITUDE INTO CONSIDERATION", the presence of the idioms starting with the index word "TAKE" is detected by the idiom lexicon look-up. (Idioms such as "TAKE OUT", "TAKE IN" and "TAKE !N INTO CONSIDERATION" are included.) In a step 1092. The phrasal elements which are right-adjacent and left-adjacent to the node NS(i) are combined and it is checked to see if the combination corresponds to a pattern in the split idiom lexicon. In the present example, "HIS GOOD ATTITUDE" is analyzed as a noun phrase (N) in the phrase structure analysis processing and the combination corresponds to the idiom lexicon pattern "TAKE !N INTO CONSIDERATION" (FIG. 5C). If the input English text corresponds to more than one split idiom patterns, the longest one of the split idiom patterns is selected (step 1093). In a step 1094, a portion of the input text which corresponds to the idiom in the split idiom lexicon is taken as a new node (parent node) and the newly generated parent node is placed for the daughter nodes to modify the phrasal element table. That is, the daughter nodes corresponding to the split idiom pattern are deleted from the phrasal element table and the parent node is substituted therefor. When the new node is generated, the idiom lexicon is looked up again starting from the phrasal element next to the last word of the newly generated node ("CONSIDERATION" in the present example) (steps 1095, 1096 and 1097).

Through the idiom lexicon re-look-up processing described above, a final phrasal element string table is formed.

(6) English Sentence Pattern Analysis

In the English sentence pattern analysis processing, nodes NS(i) are divided into groups each having more than one node and they are classified into predetermined English sentence patterns. The English sentence pattern analysis processing includes a step for imparting syntatic roles to the respective nodes and a step for detecting sentences, clauses, or quasi-clauses from the sequence of the syntatic roles. The syntatic role represents a role of a node in the phrasal element string table in a sentence, that is, which one of subject (SUBJ), governor (GOV), object (OBJ) and etc. it corresponds to.

A flow of the English sentence pattern analysis processing is now explained with reference to FIGS. 19 and 20A.

As a result of the phrase structure analysis processing, the phrasal element string table storage area 405 now stores information shown in rows *11, *12, *13 and *14 in FIG. 20. The row *11 stores node number information. The row *12 stores words or idioms corresponding to the nodes. In actuality, it stores information on pointers to the node stream table. The row *13 stores categories of the nodes, that is, information on word (W), phrasal element (P), clause (C), quasi-clause (Q) and sentence (S). The row *14 stores parts of speech of the words and idioms or type numbers of the quasi-clauses, clauses and sentences. The row *15 stores syntatic roles which are derived in the English sentence pattern analysis processing.

Figure 19:
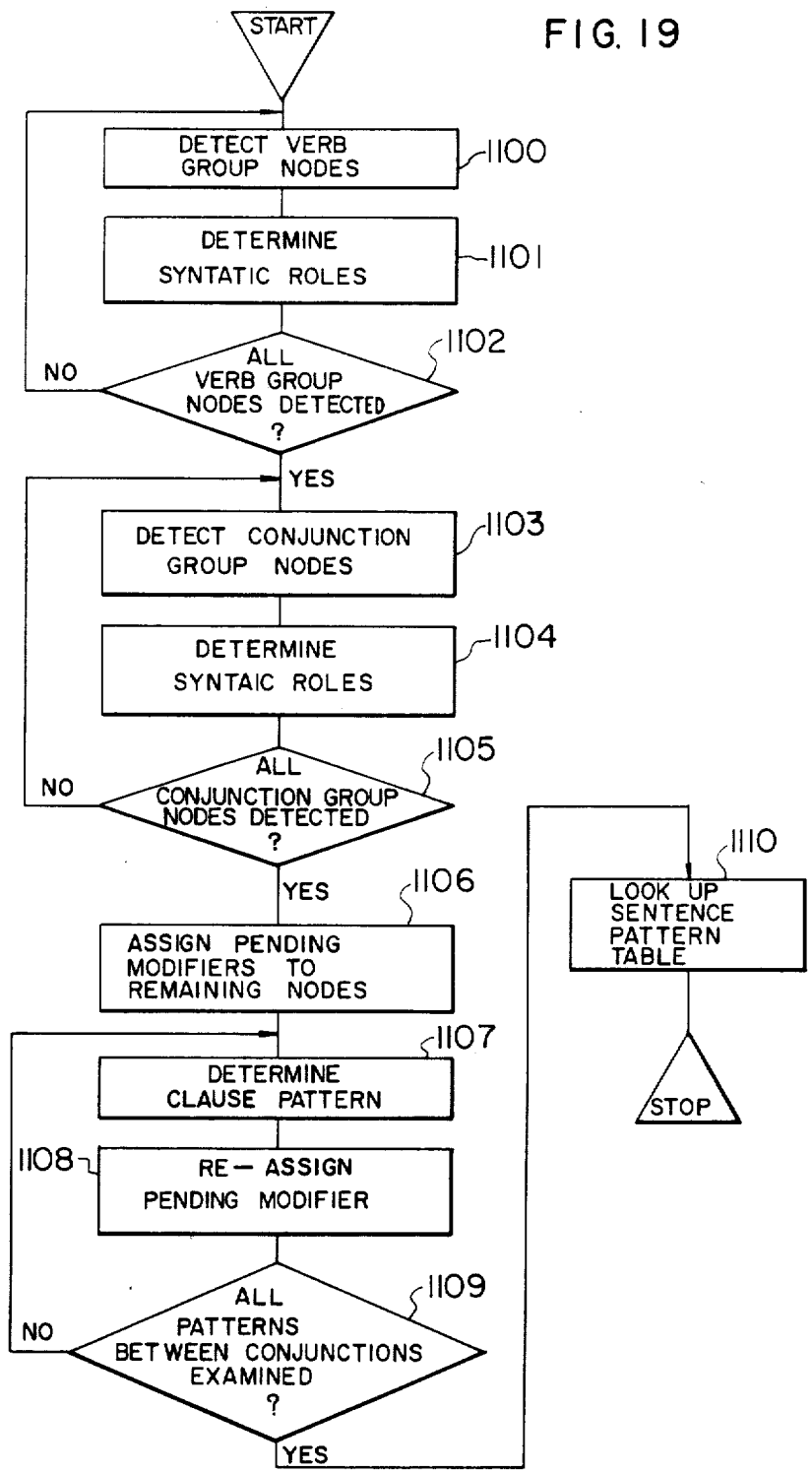
FIG. 19 shows a flow of the English sentence pattern analysis processing in the present method.

In a step 1100 of FIG. 19, the parts of speech of the nodes in the phrasal element table 405 are sequentially examined and the parts of speech corresponding to verb group (verb and TO+verb) are detected. In an example shown in FIG. 20A, nodes NS(2), NS(9), NS(22) and NS(24) are verb group. In a step 1101, a verb pattern table is looked up by using sub-class information of the detected verb group nodes (that is, types of the verbs) as index words (entries) to determine the syntatic roles of the verb group nodes and the left-adjacent and right-adjacent nodes thereto.

An example of the verb pattern table is shown in FIG. 8A. The item 1 shows a type $V_1$ in which the index word is a be-verb and "noun (N) or pronoun (PRN)" and "noun (N) or pronoun (PRN)" are at the right-adjacent and left-adjacent positions thereto. More specifically, when the parts of speech of the string of nodes NS(i), NS(j) and NS(k) are noun (N) or pronoun (PRN), verb (V), noun or pronoun (PRN) in this order, the syntatic roles of subject (SUBJ), governor (GOV) and complement (COMP) are assigned to the nodes NS(i), NS(j) and NS(k), respectively. The item 3 indicates a type $V_3$ in which the index word is an intransitive verb and a noun (N) node or a pronoun (PRN) node is at the left-adjacent position. More specifically, when the parts of speech of the nodes NS(i) and NS(j) are noun or pronoun, and verb, respectively, the syntatic roles of subject (SUBJ) and governor (GOV) are assigned to the nodes NS(i) and NS(j), respectively. The item 4 indicates that when the parts of speech of the nodes NS(i) and NS(j) are infinitives, the syntatic roles of infinitive form governor (TOGOV) and infinitive form object (TO OBJ) are assigned to the nodes NS(i) and NS(j), respectively.

Figure 20A:
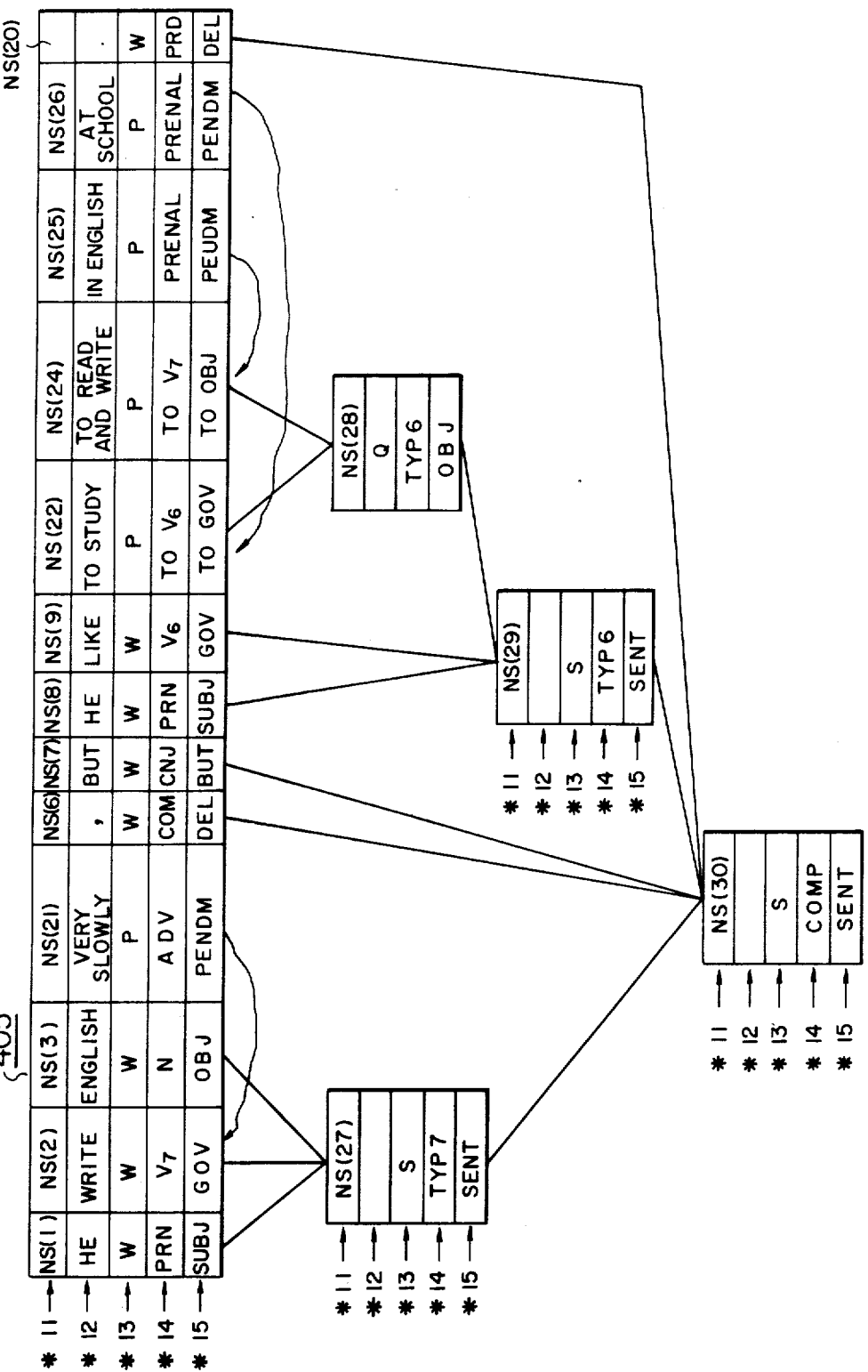
FIGS. 20A and 20B show the contents of information stored in a phrasal element table.

In the example of the English text shown in FIG. 20A, the parts of speech of the nodes NS(1), NS(2) and NS(3) are pronoun (PRN), verb ($V_7$) and noun (N), respectively. Thus, it is detected that it corresponds to the string of parts of speech of the item 6 in FIG. 8A. Thus, the syntatic roles of subject (SUBJ), governor (GOV) and object (OBJ) are imparted to the nodes NS(1), NS(2) and NS(3), respectively, and they are stored in the storage area *15. The string of parts of speech for the nodes NS(22) and NS(24) corresponds to the pattern of the item 4 and hence the syntatic roles of TOGOV and TOOBJ are assigned to the nodes NS(22) and NS(24), respectively. Similarly, the syntatic roles are assigned to the nodes NS(8) and NS(9). FIG. 8A shows only a part of the verb patterns and a number of patterns are prepared in actuality.

In this manner, through the step 1101 of FIG. 19, the syntatic roles of the nodes NS(1), NS(2), NS(3), NS(8), NS(9), NS(22) and NS(24) which are right-adjacent and left-adjacent to the verbs are determined, pending other nodes undetermined. In a step 1102, it is checked to see if the verb pattern table has been looked up for all of the verb group nodes, and if the decision is YES, the process goes to a step 1103, where the parts of speech of the remaining nodes in the phrasal element table 405 are sequentially examined and the nodes having the conjunction (CNJ) are detected. In a step 1104, a conjunction pattern table is looked up for the detected conjunction group nodes to determine the syntatic roles of the conjunction group nodes.

An example of the conjunction pattern table is shown in FIG. 8B. The item 1 indicates that when the word spelling of the conjunction (CNJ) is "BUT" and the syntatic role string patterns which are left-adjacent and right-adjacent thereto are punctuation (DEL), BUT, subject (SUBJ) and governor (GOV), a syntatic role BUT (which has the same spelling as the word "BUT") for representing a coordinating conjunction is assigned to the word "BUT". The item 2 indicates that when the word spelling of the conjunction is "IF" and the syntatic role string patterns which are left-adjacent and right-adjacent thereto are subject (SUBJ), type 8 governor (GOV), IF and subject (SUBJ), a syntatic role NIF, which represents IF which is followed by a noun clause, is assigned to the word "IF". Similarly, the items 3, 4, 5 and 6 indicate rules for assigning a syntatic role ADIF, which represents IF which is followed by an adverbial clause, and a syntatic role NTHAT, which represents THAT which is followed by a noun clause, are shown.

In the English text shown in FIG. 20A, a syntatic role string pattern which corresponds to the pattern of the item 1 of the conjunction table (FIG. 8B) exists around the word of the node NS(7). Thus, through the execution of the step 1104, the syntatic role BUT is assigned to the node NS(7). The syntatic roles (DEL), representing the punctuation, are assigned to the nodes NS(6) and NS(20) by analyzing the parts of speech thereof (COM and PRD).

In a step 1105, it is checked to see if the look-up of the conjunction table has been completed for all of the nodes having the conjunction, and if the decision is YES, the process goes to a step 1106, where pending modifiers (PENDM), representing the fact that the syntatic modifiers are pending, are assigned to the nodes having no syntatic roles assigned in the previous steps, that is, the nodes having adverbial (ADV) and preposition (preral) parts of speech. In the example of the English text shown in FIG. 20, the pending modifiers (PENDM) are assigned to the nodes NS(21), NS(25) and NS(26).

In a step 1107, it is checked to see if a clausal pattern or a quasi-clausal pattern is included in the syntatic role string pattern delimited by the conjunction group nodes (e.g. AND, BUT, OR, ADIF and HTHAT), and if it is included, the clausal or quasi-clausal pattern table (hereinafter simply referred to as clausal pattern table) is referred to impart "node category", "clause or quasi-clause syntatic role" and "clause or quasi-clause type" to the clause or quasi-clause.

An example of the clausal pattern table is shown in FIG. 8C. The item 1 indicates that when a syntatic role of a conjunction (called a preceding conjunction) preceding to the syntatic role string pattern delimited by the conjunctions or punctuations "has no AND, OR, BUT or conjunction" and said syntatic role string pattern is "subject (SUBJ)+governor (GOV)", the pattern is formed into a new parent node and a category "sentence (S)" is assigned to the parent node, "SENT" representing the completion of a sentence is imparted as the syntatic role to the parent node and a type number (#) e.g. "TYP 1" of the governor (GOV) is assigned as a type of sentence. The types of clause and sentence are determined to be equal to the types of the governors (GOV) which govern the clause and sentence. The example of the type numbers of verbs is shown in Table 1B.

The item 2 indicates the syntatic role string of the daughter nodes when the category of the parent node is "sentence (S)", the syntatic role thereof is "SENT" representing the completion of the sentence and the sentence type is a type number (#), e.g. "TYP 2" of the governor (GOV).

The item 4 indicates that when the syntatic role string pattern preceding to the conjunction or the punctuation is "TO infinitive type governor (TOGOV)+TO infinitive type object" and the syntatic role of the node preceding the node is governor (GOV) or ING type governor (INGGOV), that pattern is formed into a parent pattern and "quasi-clause (Q)" is assigned to the parent node as the category thereof, "object (OBJ) is assigned as the syntatic role and type number (#), e.g. "TYP 6" of the governor (GOV) is assigned as the type of quasi-clause.

The item 6 indicates that when the syntatic role string pattern of the delimited string of nodes is "subject (SUBJ)+governor (GOV)+complement (COMP)" and the syntatic role of the node preceding to the pattern is ADIF (IF followed by adverbial clause), that pattern is formed into a parent pattern and "clause (C)" is imparted to the parent node as the category thereof, "clausal adverb (CADV)" is assigned as the syntatic role and type number (#), e.g. "TYP 2" of the governor (GOV) is assigned as the type of clause.

Referring back to FIG. 19, the processing in the step 1107 is explained specifically. In the English text shown in FIG. 20, the syntatic role string pattern of the nodes NS(1), NS(2) and NS(3) corresponds to the pattern of the item 3 in FIG. 8C. Thus, those nodes NS(1), NS(2) and NS(3) are formed into a new parent node NS(27), which is then stored in the area *11. The area *13 stores information representing the fact that the category is the sentence, the area *14 stores the type of the sentence, TYP 7 and the area, *15 stores the syntatic role SENT which represents the fact that the parent node is a complete sentence.

The syntatic role string pattern of the nodes NS(22) and NS(24) corresponds to the pattern of the item 4 in FIG. 8C and a new parent node NS(28) is generated. The quasi-clause is assigned to the parent node NS(28) as the category thereof, TYP 6 is assigned as the type of the quasi-clause and object (OBJ) is assigned as the syntatic role.

The syntatic role string pattern of the nodes NS(8), NS(9) and NS(28) corresponds to the pattern of the item 3 in FIG. 8C. Thus, a new parent node NS(29) is generated and the information derived from the look-up is stored in the respective areas for the parent node NS(29).

In this manner, in the step 1107, a sentence, clause or quasi-clause is detected from the syntatic role string and a new node number is assigned to the clausal pattern. While not explained in detail here, when a new parent node is generated, the daughter nodes in the phrasal element table 405 are deleted in the same manner as described above and the newly generated parent node is substituted therefor. The parent node stores the pointers to the daughter nodes. Accordingly, at the end of the step 1107, the nodes in the phrasal element string table 405 are arranged in the sequence of NS(27), NS(21), NS(6), NS(29), NS(25), NS(26) and NS(20).

In a step 1108, if the clausal node is an adverbial clause (CADV) or adjective clause (CADJ), a pending modifier (PENDM) is assigned thereto. In the English text shown in FIG. 20, no adverbial clause nor adjective clause is included. Accordingly, it is not a node to which the pending modifier is assigned.

In a step 1109, it is checked if all of the syntatic role string patterns delimited by the conjunctions have been examined. If the decision is YES, the process goes to the last step 1110, where it is checked to see if the clausal pattern derived from the step 1107 corresponds to a predetermined frame pattern, and if it corresponds, a new mode is generated. In this decision step, the frame pattern table shown in FIG. 8D is used. The relation between the symbols shown in FIG. 8D and the information stored in the storage areas of FIG. 20A is shown in FIG. 20B.

Figure 20B:
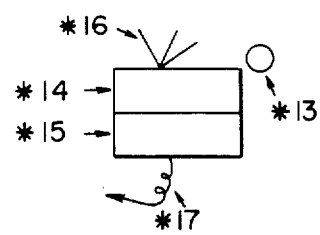

The relation shown in FIG. 20B is defined one for each node. FIG. 20B shows a simplified representation for one column (vertical line of *11–*15) of FIG. 20A.

The item *14 of FIG. 20B stores the parts of speech of the words and phrasal elements or type number of the clause, quasi-clause or sentence.

The item *15 of FIG. 20B stores the syntatic roles.

The item *13 at top left of FIG. 20B stores the category (W, P, Q, S) of the node.

A branch symbol at *16 of FIG. 20B indicates pointers to the daughter nodes which belong to the present node. It corresponds to the information stored at *12 in FIG. 20A.

A wavy line at *17 of FIG. 20B indicates dependency and modifying relation of the adverbial phrace/clause or adjective phrase/clause. A node at the tail of the wavy line arrow modifies a node at the top of the arrow.

The item 1 indicates that when the nodes which are left-adjacent and right-adjacent to the node whose category is clause (C), are φ (no node), that is, when there is only one clausal pattern except the node having the pending modifier assigned thereto, that category (*13) is transformed to sentence (S) and the syntatic role (SENT) representing that the sentence is complete is stored in the area *15 of the table.

The item 2 indicates that when a node pattern having a node whose category is sentence (S), followed by a node whose syntatic role is punctuation (DEL), followed by a node whose syntatic role is AND, BUT or OR, followed by a node whose category is sentence (S), followed by a node whose syntatic role is punctuation (DEL) is detected, those nodes are formed into a new node and category of sentence (S) for the new node is stored in the area *13, information representing a compound sentence (COMPD) is stored in the area *14 and syntatic role SENT representing that the sentence is complete is stored in the area *15.

In the English text shown in FIG. 20A, the node string pattern NS(27), NS(6), NS(7), NS(29) and NS(20) excluding the nodes having the pending modifiers assigned thereto corresponds to the pattern of the item 2 in FIG. 8D. Thus, this node string is formed into a new node NS(30) and new information are written in the areas *13, *14 and *15.

In this manner, all of the nodes in the English text shown in FIG. 20A except the nodes having the pending modifiers assigned thereto are formed into the single node NS(30). The node NS(30) is referred to as an English sentence skeleton pattern.

(7) Dependency and Modifying Relation Analysis

In the dependency and modifying relation analysis processing, the words, phrases or clauses of the nodes which are modified by the nodes having the pending modifiers (PENDM) assigned thereto as the syntatic roles in the English sentence pattern analysis processing are determined.

Figure 21:
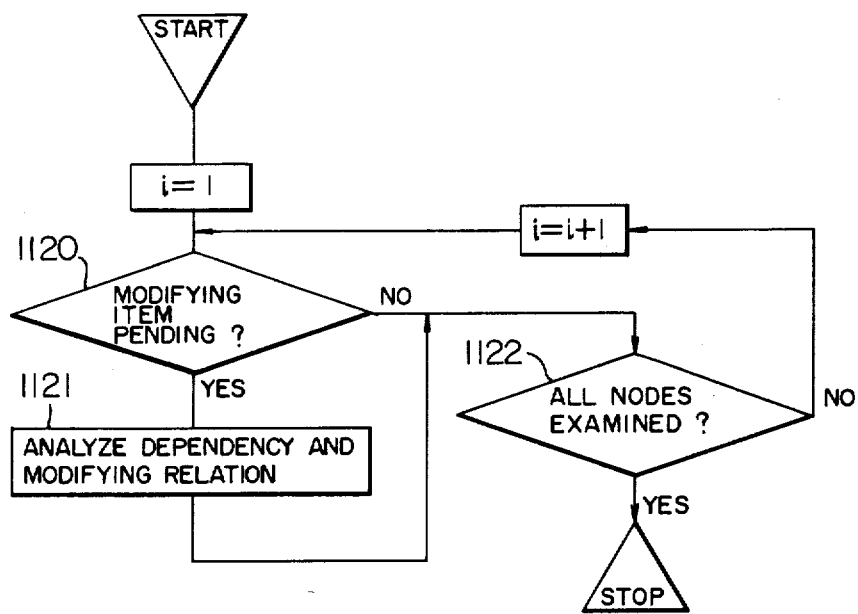
FIG. 21 shows a flow of dependency and modifying relation analysis processing in the present method.

FIG. 21 shows a flow of the dependency and modifying relation analysis processing. In a step 1120, it is checked to see if node NS(i) has a pending modifier (PENDM) as the syntatic role. If the decision is YES, the process goes to a step 1121 where the dependency and modifying relation analysis processing is carried out. On the other hand, if the decision is NO, the process goes to a step 1122 where it is checked to see if the step 1120 has been carried out for all of the nodes. If the decision is NO, the process goes back to the step 1120 to repeat the same steps.

In the English text shown in FIG. 20A, the nodes NS(21), NS(25) and NS(26) are determined to have the pending modifiers in the step 1120. The words, phrases or clause to which those nodes modify are determined by referring to the dependency and modifying relation analysis table stored in the lexicon storage 300 (FIG. 3).

TABLE 2

| ITEM NUM-BER | CONDITIONS FOR NODE NS (i) | | | | | MODIFICATION | |
|---|---|---|---|---|---|---|---|
| | CATE-GORY | SYNTATIC ROLE | PART OF SPEECH | SUB-CLASS OF PART OF SPEECH | POSITIONAL RELATION OF DEPENDENCY | SYNTATIC ROLE | MODIFIED ITEM |
| 1 | W . P . Q . C | | ADC | | (1) HEAD OF THE SENTENCE OR (2) PRECEDED BY COM | ADVAL | SMALLEST NUMBER NODE WITH "SENT" AS ITS SYNTATIC ROLE |
| 2 | W . P . Q . C | | PRENAL | | (1) HEAD OF THE SENTENCE OR (2) PRECEDED BY COM | ADVAL | SMALLEST NUMBER NODE WITH "SENT" AS ITS SYNTATIC ROLE |
| 3 | W | | ADV | | IMMEDIATELY AFTER PART OF SPEECH V | ADVAL | IMMEDIATELY PRECEDING NODE WITH GOV OR *GOV AS SYNTATIC ROLE |
| 4 | P | | PRENAL | | HAVING NO IMMEDIATELY PRECEDING NODE WITH PART OF SPEECH "N" | ADVAL | NODE WHICH MEETS ALL OF THE FOLLOWINGS: (1) OF SPEECH IS IN VERB GROUP (V, TOV, INGV, ENV) (2) NODE NUMBER IS SMALLER THAN i (3) NODE NOT MODIFIED BY ADVAL NODE IS PREFER-ENTIALLY SELECTED (4) LARGEST NODE NUMBER OF THOSE WHICH MEET (1), (2) AND (3) |
| 5 | P | | PRENAL | | HAVING IMMEDIATELY PRECEDING NODE WITH PART OF SPEECH "N" | PSTADJ | NODE HAVING IMMEDIATELY PRECEDING NODE WITH PART OF SPEECH "N" |

Table 2 shows an example of the dependency and modifying relation analysis table. The item 1 indicates that when the category of node NS(i) is any one of word (W), phrasal element (P), quasi-clause (Q) and clause (C), the part of speech is adverb (ADV) and the node is at the top of the sentence or the node is preceded by a punctuation (COM), an adverbial modifier (AD-VAC) is assigned to the node as the syntatic role thereof and it should modify the smallest number node having the syntatic role "SENT". Similarly, the items 2, 3, 4 and 5 indicate the conditions for the node NS(i), and relations between the node numbers of the nodes to which the node NS(i) modifies and the syntatic roles imparted to the node NS(i).

Considering the node NS(25) of the English text shown in FIG. 20A, the part of speech of the node is preposition (PRENAL) and the node NS(25) has no immediately preceding noun (N) node. Thus, the rule in the item 5 of the Table 2 is applied. Since the node to be modified should be a node which is in verb group and has the largest node number but smaller than 25, the node (24) is finally selected. The syntatic role of the node NS(25) is ADVAL.

Similarly, the rule of the item 5 of the Table 2 is also applied to the node NS(26). The node to be modified is the node NS(22) and the syntatic role is ADVAL.

The rule applied to the node NS(21) is not shown in the Table 2 but it is finally determined that the node NS(21) modifies the node NS(2) in the same principle.

In FIG. 20A, $\boxed{\alpha} \longmapsto \boxed{\beta}$ represents that the node α modifies the node β.

By the above dependency and modifying relation analysis processing, the relations among the nodes are determined and there exists no node which is free from the node string.

(8) Tree/list Transformation

In the tree/list transformation processing, the sequence of nodes is transformed from the English sentence pattern to the Japanese sentence pattern.

Figure 22:
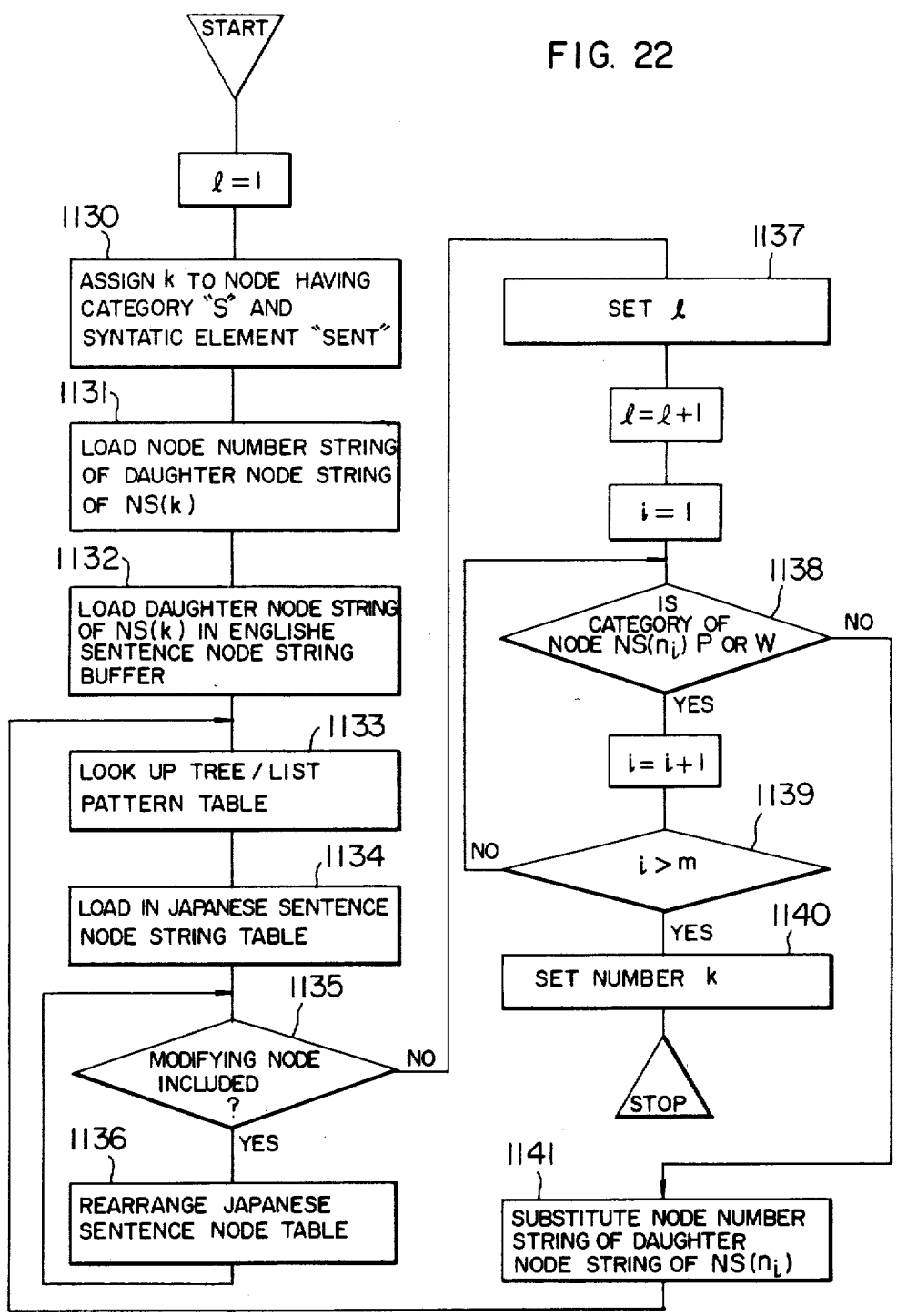
FIG. 22 shows a flow of tree/list transformation processing in the present method.

FIG. 22 shows a flow of the tree/list transformation processing.

In a step 1130, a node which finally remains in the phrasal element string table, that is, a node having the category of "S" and the syntatic element of "SENT" is detected and a node number k is assigned thereto. In the English text shown in FIG. 20A, the node NS(30) is the single last generated node and it is designated by NS(k).

In a step 1131, the sequence of the daughter nodes of the node NS(k) are read and the node number string thereof is loaded to the phrasal element string table. The node NS(k) is erased immediately before the loading of the daughter node number string. In the English text shown in FIG. 20A, the string of the node NS(30)'s daughter nodes is NS(27), NS(6), NS(7), NS(29) and NS(20). Thus, the numbers 27, 6, 7, 29 and 20 thereof are loaded in the phrasal element string table in this sequence. It is assumed that the number of node numbers loaded in the phrasal element string table is m.

In a step 1132, the daughter node string of the node NS(k) is loaded in the English sentence node string buffer area 406 of the working storage 400.

In a step 1133, the tree/list transformation table 307 in the lexicon storage 300 is looked up to retrieve an English sentence pattern which corresponds to the sequence of the syntatic roles of the daughter node string loaded in the buffer area 406. An example of the tree/list pattern table is shown in Table 3, a content of which will be explained later.

phrasal element (P) or a word (W), where ni is a node number of the i-th node in the phrasal element table.

In the English text shown in FIG. 20, the i-th (i=1) node in the daughter node string in the node NS(30) is the node NS(27) and the category thereof is a sentence (S). Thus, the decision in the step 1138 is NO and the process goes to a step 1141.

In the step 1141, the sequence of daughter nodes of the node NS(ni) is read and it is substituted for ni in the phrasal element node string table. Accordingly, m is also incremented. The read daughter node string of the node NS(ni) is then written in the English sentence

TABLE 3

| ITEM NUMBER | ENGLISH SENTENCE PATTERN | | TRANSFORMED JAPANESE SENTENCE PATTERN |
|---|---|---|---|
| | PARENT NODE | SEQUENCE OF DAUGHTER NODES | |
| 1 | SENT | SENT DEL BUT SENT | SENT, BUT SENT |
| 2 | SENT | SUBJ GOV OBJ | SUBJ OBJ GOV |
| 3 | CATEGORY = S OR C | SUBJ GOV TOOBJ | SUBJ TOOBJ GOV |
| . | ... | ... | ... |

In a step 1134, a Japanese sentence pattern corresponding to the retrieved English sentence pattern is read and loaded in the Japanese sentence node string buffer area 407 in the working storage 400.

The tree/list table shown in the Table 3 shows transformation rules which transform English sentence patterns to Japanese sentence patterns. The item 1 indicates that when the syntatic role of the parent node of the English text is sentence (SENT) and the daughter node string is SENT, DEL, BUT, SENT, the sequence of the syntatic roles of the Japanese sentence pattern is SENT, ",", BUT, SENT. The item 3 indicates that when the category of the parent node is sentence (S) or clause (C) and the syntatic roles of the daughter node string are subject (SUB), governor (GOV), TO plus object (TOOBJ) in this sequence, the syntatic roles in the Japanese sentence pattern are arranged in the sequence of SUBJ, TOOBJ, GOV.

In the English text shown in FIG. 20A, the syntatic roles of the daughter node string are SENT, DEL, BUT, SENT which correspond to the English sentence pattern in the item 1 of the Table 3. Thus, it is transformed to the Japanese sentence pattern shown in the item 1 in the step 1133.

Referring back to FIG. 22, in a step 1134, the Japanese sentence pattern derived in the step 1133 is loaded in the node JN(1) of the Japanese sentence node string buffer area 407. FIG. 23 shows the content of the English sentence node string buffer area 406 and the corresponding transformed content of the Japanese sentence node string bufffer area 407.

In a step 1135, it is checked as to each node in the Japanese sentence string table JN(l), to see if it is modified by other nodes. If the decision is YES, the process goes to a step 1136, and if the decision is NO. the process goes to a step 1137. In the English text shown in FIG. 20A, as to each of node NS(27) and NS(29), there exist a nodes which modifies it or its daughter node, and hence the process goes to the step 1136.

In the step 1136, the modifying node is positioned immediately before the modified node to rearrange the Japanese sentence node string table JN(1) (FIG. 23).

On the other hand, in the step 1137, the Japanese sentence table pointer of the node NS(k) is set to 1 and l is then set to l+1 and i is set to 1. Then, in a step 1138, it is checked if the category of the node NS(ni) is a node string buffer area 406 (FIG. 23). In the English text shown in FIG. 20A, the daughter nodes of the node NS(27) are NS(1), NS(2) and NS(3). Thus, the syntatic roles SUBJ, GOV and OBJ of those nodes are written in the nodes EN(1), EN(2) and EN(3), respectively, of the English sentence node string buffer area 406.

After the above step, the process goes back to the step 1133 where the tree/list pattern table (Table 3) is again looked up. Since the sequence of the syntatic roles SUBJ, GOV, OBJ loaded in the English sentence node string bufffer area 406 corresponds to the English sentence pattern in the item 2 to the Table 3, it is transformed to the corresponding Japanese sentence pattern SUBJ, OBJ, GOV, which is then written in JN(2) of the Japanese sentence node string buffer area 407. In a step 1135, it is checked as to each node in the area JN(l), to see if it is modified by other nodes. In the present example, there is a node which modifies the node NS(2) GOV. Accordingly, the syntatic role ADVAL (which has been previously transformed from PENDM) of the modifying node NS(21) is positioned immediately before GOV to rearrange the syntatic role string of the area JN(2) (step 1136). As a result, the final syntatic role string loaded in the area JN(2) is SUBJ, OBJ, ADVAL, GOV (FIG. 23).

In this manner, the first (i=1) node NS(27) of the node NS(30) has been processed. Then, the next daughter node NS(6) is processed. Since the category of the node NS(6) is the word (W), the decision in the step 1138 is YES and i is set to i+1. That is, the next daughter node NS(7) is now processed. Since the category of the node NS(7) is also the word (W), i is set to i+1 and the next daughter node NS(29) is processed. Since the syntatic role of the node NS(29) is the sentence (SENT), the syntatic roles of the daughter node string NS(8), NS(9), NS(28) are loaded in the English sentence buffer memory and the tree/list pattern table is again looked up (step 1134). Thus, the Japanese sentence pattern is retrieved and the Japanese sentence pattern shown in FIG. 23 is finally written in the area JN(3) of the Japanese sentence node buffer 407.

In this manner, when the tree/list transformation has been completed for all of the daughter nodes of the node NS(k) (k=30 for the English text shown in FIG. 20A), the process goes to a step 1140. In the step 1140, all contents of the phrasal element string table are cleared and the number k is set. Thus, the tree/list transformation of the node NS(k) is completed.

(9) Japanese Sentence Generation

In the Japanese sentence generation processing, the target language equivalents are assigned to the nodes of the Japanese sentence pattern to generate a Japanese sentence.

Figure 24A:
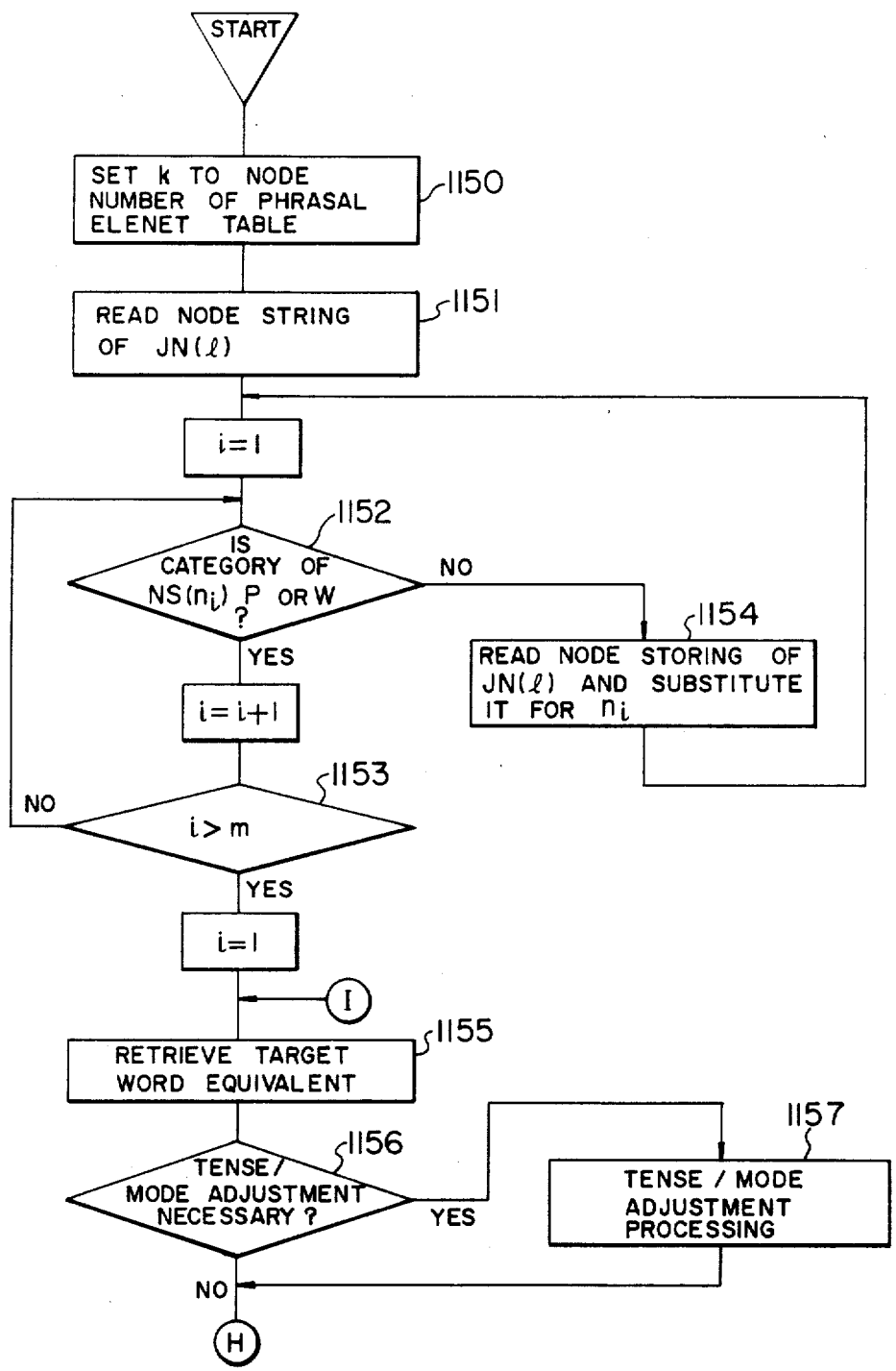
FIGS. 24A, 24B and 24C show flows of Japanese sentence generation processing in the present method.
Figure 24B:
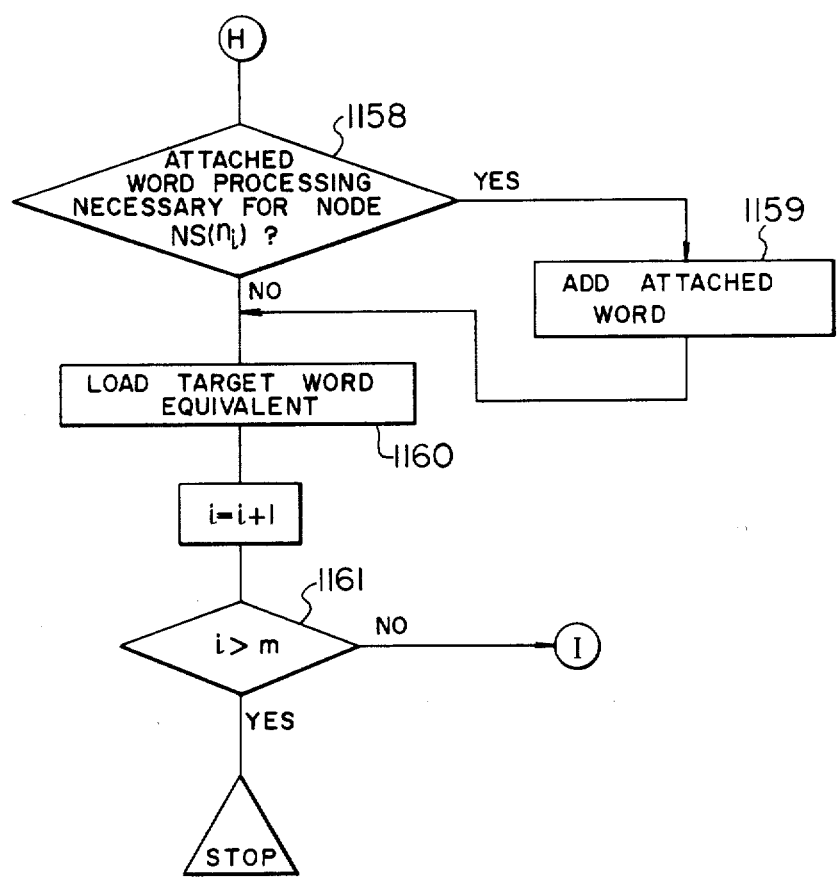

FIGS. 24A and 24B show a flow of the Japanese sentence generation processing.

In a step 1150, the single node finally generated in the phrasal element table, that is, the node having the category "S" and the syntatic role "SENT" is detected and the node number k is assigned thereto. In a step 1151, the pointer l to the Japanese sentence buffer table which stores the Japanese sentence derived from tree/list transforming the English sentence pattern of the node NS(k) is detected. The node string loaded in the Japanese sentence buffer table JN(l) is read and the node number string thereof is written in the phrasal element string table. In the English text shown in FIG. 20A, the pointer l to the Japanese sentence buffer table in the node NS(30) (k=30) is 1, and the area JN(1) of the Japanese sentence buffer 407 stores the node number string (27), (6), (7), (29), (20). Thus, this number string is written in the phrasal element string table. For the sake of convenience of explanation, it is assumed that the number of node numbers loaded in the phrasal element table is m and the node number string loaded is $n_1, n_2, \ldots n_m$.

In a step 1152, it is checked to see if the category of the node NS($n_i$) is P or W, where $n_i$ is the node number of the i-th node in the phrasal element string table. Since the node number of the first (i=1) node in the buffer area JN(1) of FIG. 23 is 27 and the category of the node NS(27) is SENT, the decision in the step 1152 is NO and the process goes to a step 1154.

In the step 1154, the pointer to the Japanese sentence buffer table in the node NS($n_i$) is set to 1. The node string in the Japanese sentence node string table JN(1) is read and it is substituted for $n_i$ in the phrasal element string table. Accordingly, m is also increased.

In the example shown in FIG. 23, NS($n_i$)=NS($n_j$) =NS(27) and the pointer l in NS(27) is 2. Thus, the node string (1), (3), (21) stored in the buffer area JN(1) or JN(2) is read and it is substituted for the node number (27) stored in the phrasal element string table. As a result, the node numbers in the phrasal element string table are rearranged to (1), (3), (21), (2), (6), (7), (29), (20), and the number m is changed from 5 to 8. After the step, the process goes back to the step 1152, where it is checked to see if the category of the first (i=1) node NS(1) of the rearranged node string is the phrasal element (P) or the word (W). Since the category of the node NS(1) is the word (W), the decision in the step 1152 is YES and i is set to i+1. In a step 1153, it is checked to see if i>m and the process goes back to the step 1152.

Figure 25:
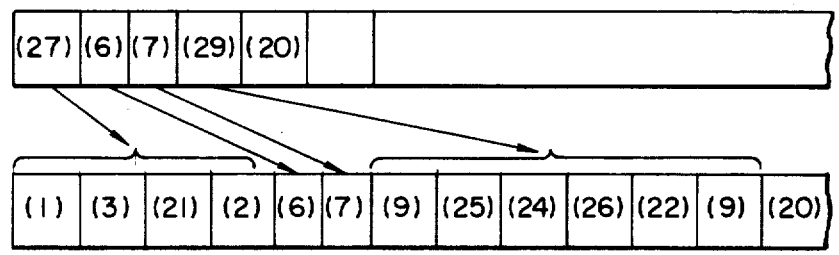
FIG. 25 illustrates the Japanese sentence generation processing.

By repeating the above steps, the node numbers are finally stored in the phrasal element string table in the sequence of (1), (3), (21), (2), (6), (7), (9), (26), (25), (24), (22), (20) as shown in FIG. 25. Through the steps so far described, the input English text has been transformed to the word sequence inherent to the Japanese sentence.

In a step 1155, the area of the word stream table 403 (FIG. 14A) in which the information on the node NS($n_i$) is stored is looked up, where $n_i$ is the node number of the i-th node in the phrasal element string table, and the word/idiom memory buffer area 401 (FIG. 10) which stores the information on the word records is looked up to impart the target language (Japanese) equivalent to the node NS($n_i$).

For example, for the node number (1) stored in the area of i=1 in FIG. 25, the information of the area WS(1) of the word stream table 403 is retrieved by the pointer and the information of the area WB(1) of the word/idiom buffer storage 401 is retrieved by the pointer stored in WS(1). Since the area WB(1) stores the target word equivalent to the word "HE" of the node NS(1), the target language equivalent information is read. For other nodes, the target word equivalents can be read by the pointers to the word stream tables corresponding to the respective nodes and the pointers to the word/idiom buffer storage.

In a step 1156, it is checked to see if tense/mode adjustment is necessary for the target language equivalent. In the tense/mode adjustment processing, an appropriate target language equivalent is generated for a verb phrase because the target language equivalent thereof changes depending on the kind of sentence, affirmative/negative, active passive and tense. Accordingly, the necessity of the tense/mode adjustment is determined depending on whether the node is the verb phrase or not. In other words, in the step 1156, it is checked to see if the syntatic role of the node NS($n_i$) is GOV, TOGOV or TOOBJ, and if the decision is YES, it is determined that the tense/mode adjustment is necessary.

The generation of the target language equivalent to the verb phrase is processed for the following two cases:

(a) An auxiliary verb is included.
(b) No auxiliary verb is included.

Figure 24C:
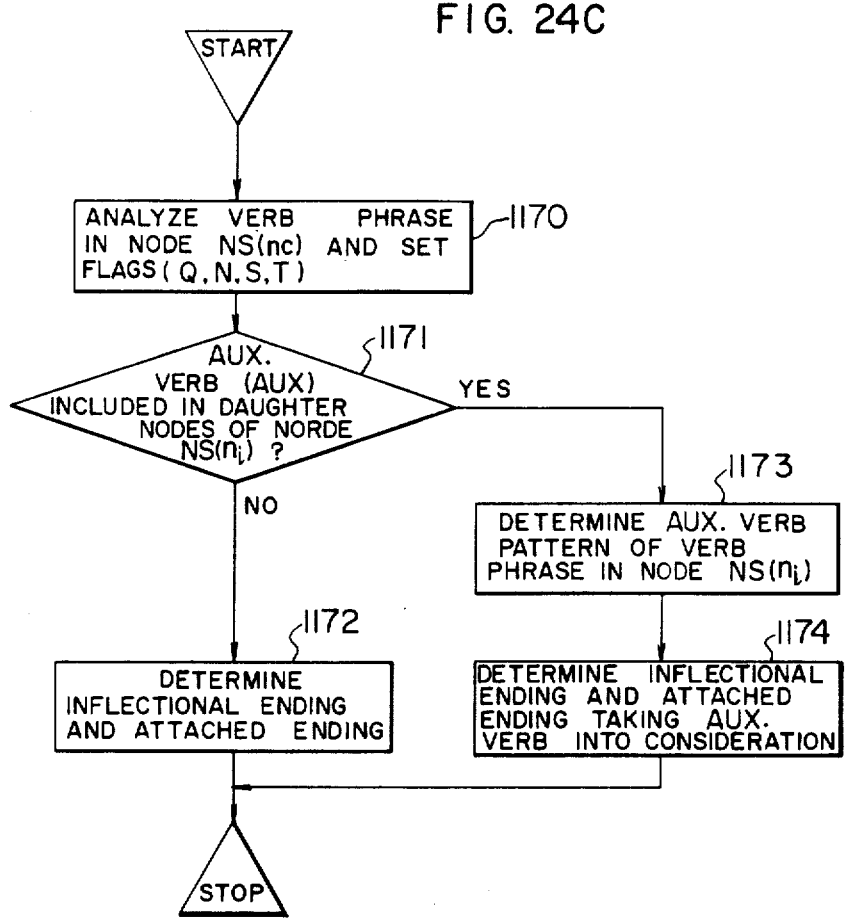

A flow of this processing is shown in FIG. 24C.

In a step 1170, a verb phrase in the node NS($n_i$) is analyzed and four flags Q, N, S, T are set in a register (not shown) in the translation processing unit 200 in the following manner. "0" or "1" is set for Q depending on kind of sentence, for N depending on affirmative or negative, for S depending on active or passive and for T depending on tense.

In a step 1171, it is checked to see if an auxiliary verb (AUX) is included in the daughter nodes of the node NS($n_i$) If the decision is YES, the process goes to a step 1173, and if the decision is NO, the process goes to a step 1172. The step in case of NO decision, that is, the case (6) above is now explained.

In the step 1172, the four flags Q, N, S and T are read from the register in the translation processing unit 200 and they are compared with the ending decision table stored in the Japanese sentence generation pattern storage area 308 of the lexicon storage 300 to determine the inflectional ending and attached ending. The determined ending is temporarily stored in a register in the translation processing unit 200. A portion of an example of the ending decision table is shown in Table 4, in which Q=0 indicates a declarative sentence, Q=1 indicates an interrogative sentence, N=0 indicates an affirmative sentence, N=1 indicates a negative sentence, S=0 indicates an active sentence, S=1 indicates a passive sentence, T=0 indicates a present tense and T=1 indicates a past tense.

TABLE 4

| ITEM NUMBER | KIND OF SENTENCE Q | AFFIRMATIVE/ NEGATIVE N | PASSIVE S | TENSE T | INSTRUCTION FOR TRANSLATION | COMMENT |
|---|---|---|---|---|---|---|
| 1 | 0 | 0 | 0 | 1 | "RENYO" + "ta" | AFFIRMATIVE |
| 2 | 1 | 0 | 0 | 1 | "RENYO" + "tanodesuka?" | INTERRROGATIVE |
| 3 | 0 | 0 | 1 | 1 | "MIZEN" + "reta" | PASSIVE |
| 4 | 1 | 0 | 1 | 1 | "MIZEN" + "retanodesuka?" | PASSIVE INTERROGATIVE |
| 5 | 0 | 1 | 1 | 1 | "MIZEN" + "nakatta" | NEGATIVE |
| 1 | 0 | 0 | 0 | 0 | "SHUSHI" | AFFIRMATIVE |
| 2 | 1 | 0 | 0 | 0 | "RENYO" + "masuka?" | INTERROGATIVE |
| 3 | 0 | 1 | 0 | 0 | "MIZEN" + "nai" | NEGATIVE |
| 4 | 1 | 1 | 0 | 0 | "MIZEN" + "nainodesuka?" | INTERROGATIVE, NEGATIVE |
| 5 | 0 | 1 | 1 | 0 | "MIZEN" + "renai" | PASSIVE, NEGATIVE |

For example, the item 1 of the Table 4 indicates that when the sentence is declarative (Q=0), the verb phrase is affirmative (N=0) and passive (S=0) and the tense is past tense (T=1), "ta" is to be added after a "RENYO" form of the verb in the target language equivalent.

A specific example of the inflectional ending decision processing is now explained.

When the verb phrase (only the underline portion) of the node NS (n$_j$) is "I STUDIED ENGLISH", a target language equivalent "benkyo" is retrieved from the word lexicon (FIG. 4B) in the step 1155 of FIG. 24A and information that the conjugation is "SA-HEN" is retrieved. The target language equivalent and the conjugation information are temporarily stored in the register in the translation processing unit 200.

In a step 1156, the decision is YES because of the verb phrase and the process goes to a step 1157, which corresponds to FIG. 24C. In the step 1170 of FIG. 24C, the four flags Q=0 (declarative sentence), N=0 (affirmative), S=0 (active) and T=1 (past tense) are stored in the register in the translation processing unit 200.

Since it has no auxiliary verb (AUX), the decision in the step 1171 is NO and the process goes to the step 1172.

In the step 1172, the inflectional ending decision table (Table 4) stored in the Japanese sentence pattern storage area 308 of FIG. 3 is looked up. Since the pattern Q, N, S, T corresponds to the item 1, the translation instruction "RENYO"+"ta" in the item 1 is read. On the other hand, since the register in the translation processing unit 200 stores "benkyo, (SA-HEN)" as the target language equivalent and conjunction information, "SA-HEN RENYO+"ta", that is, "shita" is added to the target language equivalent "benkyo" so that the target language equivalent with the inflectional ending, that is, "benkyo shita" is determined.

When an auxiliarly verb (AUX) is included in the daughter nodes of the node NS (n$_j$) and the decision in the step 1171 is YES, that is, the case (a) above, the process goes to the step 1173.

In the step 1173, an auxiliary verb sub-class table stored in the Japanese sentence generation pattern storage area 308 (FIG. 3) of the lexicon storage 300 is looked up to determine a sub-class code of the auxiliary verb in the verb phrase in the node NS (n$_j$). The determined sub-class code is temporarily stored in the register in the translation processing unit 200. A portion of an example of the auxiliary verb sub-class table is shown in Table 5, which will be explained later.

In a step 1174, the flag information Q, N, S, T determined in the step 1170 and the auxiliary verb sub-class code information determined in the step 1173 are read and they are compared with a "ending decision table with auxiliary verbs taken into consideration" stored in the Japanese sentence generation pattern storage area 308 (FIG. 3) of the lexicon storage 300 to determine the inflectional ending and the attached ending. The determined ending is temporarily stored in the register in the translation processing unit 200.

A portion of an example of the "ending decision table with an auxiliary verb taken into consideration" is shown in Table 6, which will be explained later.

The interpretation of the Table 5 is now explained.

TABLE 5

| | | COLUMN NO. | | | | | | | | | |
|---|---|---|---|---|---|---|---|---|---|---|---|
| | | 1 | 2 | 3 | 4 | 5 | 6 | 7 | 8 | 9 | 10 | 11 |
| | | VERB FORM | | | | | | | | | |
| ITEM NO. | SUB-CLASS | V (STEM) | V (PAST) | V (pp) | V (ing) | be V (ing) | be V (pp) | have V (pp) | have been V (ing) | have been V (pp) | been V (ing) | been V (pp) |
| 1 | do | DO1 | | | | | | | | | | |
| 2 | can | CA1 | | | | CA2 | CA3 | CA4 | CA5 | CA6 | | |
| 3 | may | MA1 | | | | MA2 | MA3 | MA4 | MA5 | MA6 | | |
| 4 | must | MU1 | | | | MU2 | MU3 | MU4 | MU5 | MU6 | | |
| 5 | shall | SH1 | | | | SH2 | SH3 | SH4 | SH5 | SH6 | | |
| 6 | will | WI1 | | | | WI2 | WI3 | WI4 | WI5 | WI6 | | |
| 7 | could | CO1 | | | | CO2 | CO3 | CO4 | CO5 | CO6 | | |
| 8 | might | MI1 | | | | MI2 | MI3 | MI4 | MI5 | MI6 | | |
| 9 | should | SD1 | | | | SD2 | SD3 | SD4 | SD5 | SD6 | | |
| 10 | would | WO1 | | | | WO2 | WO3 | WO4 | WO5 | WO6 | | |

The sub-classified auxiliary verbs are listed in the column of the Table 5 and the verb from such as stem, past, past participle (pp), present participle form (ing) are listed in the row. DO1, CA1, CA2, . . . , MA1, MA2, . . . are auxiliary verb sub-class codes.

The verb phrase in the node NS (ni) is analyzed to find an entry to the column and the row of the Table 5 to retrieve the sub-class code.

For example, the crosspoint of the row 9 and the column 7 is the case that Auxiliary Verb+Verb is in the form of "should have+V (pp)(past participle of verb)". In this case, as the table shows, SD4 is given as the sub-class code.

The interpretation of the Table 6 is now explained.

(AUX) is included, the decision in the step 1171 is YES and the process goes to the step 1173, where the auxiliary verb sub-class table (Table 5) stored in the Japanese sentence generation pattern storage area 308 in FIG. 3 is looked up to retrieve the code SD4 at the crosspoint of the row 9 and the column 7, and it is stored in the register in the translation processing unit 200.

In the step 1174, the "ending decision table with auxiliary verbs taken into consideration" Table 6) stored in the Japanese sentence generation pattern storage area 308 (FIG. 3) of the lexicon storage 300 is looked up. Since values Q=0, N=0, S=0 have been

TABLE 6

| ITEM NO. | AUX VERB PATTERN | 1<br>Q = 0, N = 0, S = 0 | 2<br>Q = 1, N = 0, S = 0 | 3<br>Q = 1, N = 0, S = 0 |
|---|---|---|---|---|
| 1 | MA1 | (RENYO) temo yoi<br>(SHUSHI) kamo shirenai | temo yoika<br>— | tewa naranai<br>— |
| 2 | MA2 | (RENYO) teiru kamoshirenai | | |
| 3 | MA3 | (MIZEN) reru kamoshirenai | | renai kamoshirenai |
| 4 | MA4 | (RENYO) teshimatta kamoshirenai | | renakatta kamoshirenai |
| 10 | MU1 | (MIZEN) nakereba naranai<br>(SHUSHI) ni chigainai | nakereba naranaika<br>ni chigainaika | (RENTAI) hitsuyowa nai<br>(MIZEN) naini chigainai |
| 11 | MU2 | (RENYO) teiruni chigainai | | teinaini chigainai |
| 12 | MU3 | (MIZEN) renakereba naranai | renakereba naranaika | |
| 13 | MU4 | (RENYO) tani chigainai | tani chigainaika | (MIZEN) nakattani chigainai |
| 21 | SD1 | (SHUSHI) bekide aru | bekide aruka | bekidewa nai |
| 22 | SD2 | (RENYO) teiru hazuda | | teinai hazuda |
| 23 | SD3 | | | |
| 24 | SD4 | (SHUSHI) bekide atta | | bekidewa nakatta |

In the Table 6, the sub-class codes of the auxiliary verb are exemplified in the headings or indexes of rows with item Nos. and the combinations of "1" or "0" of the above-explained flags Q, N and S are exemplified in the headings or indexes of columns with column Nos. Q, N and S are the flags for the kind of sentence (declarative or interrogative sentence), for affirmative or negative and for the kind of voice (active or passive voice), respectively. The heading (Q=0, N=0, S=0) of the column 1 represents the declarative sentence, affirmative and active. In actual, the combination of flags are not limited to the flags Q, N and S but may be formed by appropriate flags specifing linguistically significant meanings. The combination of the Q, N and S flag values derived by analyzing the verb phrase in the node NS (n<sub>i</sub>) is used as an entry to the column while the auxiliary verb sub-class code is used as an entry to the row, thereby looking up the table 6 to selectively determine the inflectional ending or the attached ending.

A specific example for the ending decision processing with auxiliary verbs taken into consideration is explained below. When the verb phrase (only the underlined portion) in the node NS (n<sub>i</sub>) is "you should have taken his opinion", "!N wo koryo" into consideration is retrieved from the idiom lexicon (FIG. 5C) in the step 1155 of FIG. 24A and the information that the conjugation is "SA-HEN" is retrieved. The idiom and conjugation information is temporarily stored in the register in the translation processing unit 200. In a step 1156, the decision is YES because it is a verb phrase and the process goes to the step 1157. The step 1157 corresponds to FIG. 24C. In the step 1170 of FIG. 24C, the four flags Q=0 (Declarative sentence), N=0 (affirmative), S=0 (active) and T=* (not set) are stored in the register in the translation processing unit 200. The process then goes to the step 1171. Since an auxiliary verb stored in the step 1170, where Q, N, and S are flags, the entry to the column 1 of the Table 6 is selected. Since the auxiliary verb sub-class code SD4 has been determined in the step 1173, the entry to the item 24 of the Table 6 is selected. Accordingly, the ending information "(SHUSHI) bekideatta" is retrieved from the Table 6. This ending information and the target language equivalent information "!N wo koryo (SA-HEN)" retrieved in the step 1155 gives the target language equivalent with the ending "!N wo koryo subekide atta".

For !N, the target language equivalent "kare no iken" is assigned by the Japanese sentence generation processing for the node corresponding to "his opinion".

When the tense/mode processing described above has been completed, the process goes to a step 1158 in FIG. 24B. In the step 1158, it is checked to see if an attached word (te, ni, wo, wa) is to be attached, and if the decision is YES, the process goes to a step 1159. The decision is YES when the syntatic role of the corresponding node NS (n<sub>i</sub>) is a subject group (SUBJ, CSUB, TOSUB, etc.) or an object group (OBJ, TODBH, IOBJ, COBJ, etc.), and NO otherwise, where SUBJ indicates a subject, CSUB indicates a subject in a clausal form, TOSUB indicates a subject in a TO infinitive form, OBJ indicates an object, TOOBJ indicates an object in a TO infinitive form, IOBJ indicates an indirect object and COBJ indicates an object in a clausal form.

The attached word processing in the step 1159 is explained for the item 2 in the Table 3. The Japanese sentence pattern of the item 2 is SUBJ, OBJ, GOV. In this case, an attached word mark (SUB) is inserted after SUBJ and an attached work mark (DOB) is inserted after OBJ. The attached words corresponding to those attached word marks are assigned by referring to the attached word table stored in the Japanese sentence generation table 308.

Table 7 shows an example of the attached word table. It indicates that the attached word may be "wa" or "ga" for the attached word mark (SUB) and "wo" or "ni" for the attached word mark (DOB).

TABLE 7

| Mark | (SUB) | | (DOB) | |
|---|---|---|---|---|
| Attached work | wa | ga | wo | ni |

When the attached word mark has a single attached word, it is substituted for the attached work mark. When the attached word mark has two or more attached words, one of them is selected in the following manner.

For the attached word mark (SUB), "ga" is assigned if the node (whose syntatic ro Le IfaSENT) modified other node, and "wa" is assigned otherwise.

For the attached word mark (DOB), "ni" is assigned if the target language informat for the verb includes a flag indicating that "ni" may be selected (it is set in the column of the attached word function word in FIG. 4A) and "wo" is assigned otherwise. As a result, "resemble" is translated into "~ni niru" and "study" is translated into "~wo benkyōsuru".

After the attached word processing, the process goes to a step 1160 where the final target word equivalent for the node NS (ni) is loaded in the output text table area 408 starting from the leftmost position. Then, the process goes to a step 1161 and the above step is repeated until the relation of i>m is met.

Figure 26:
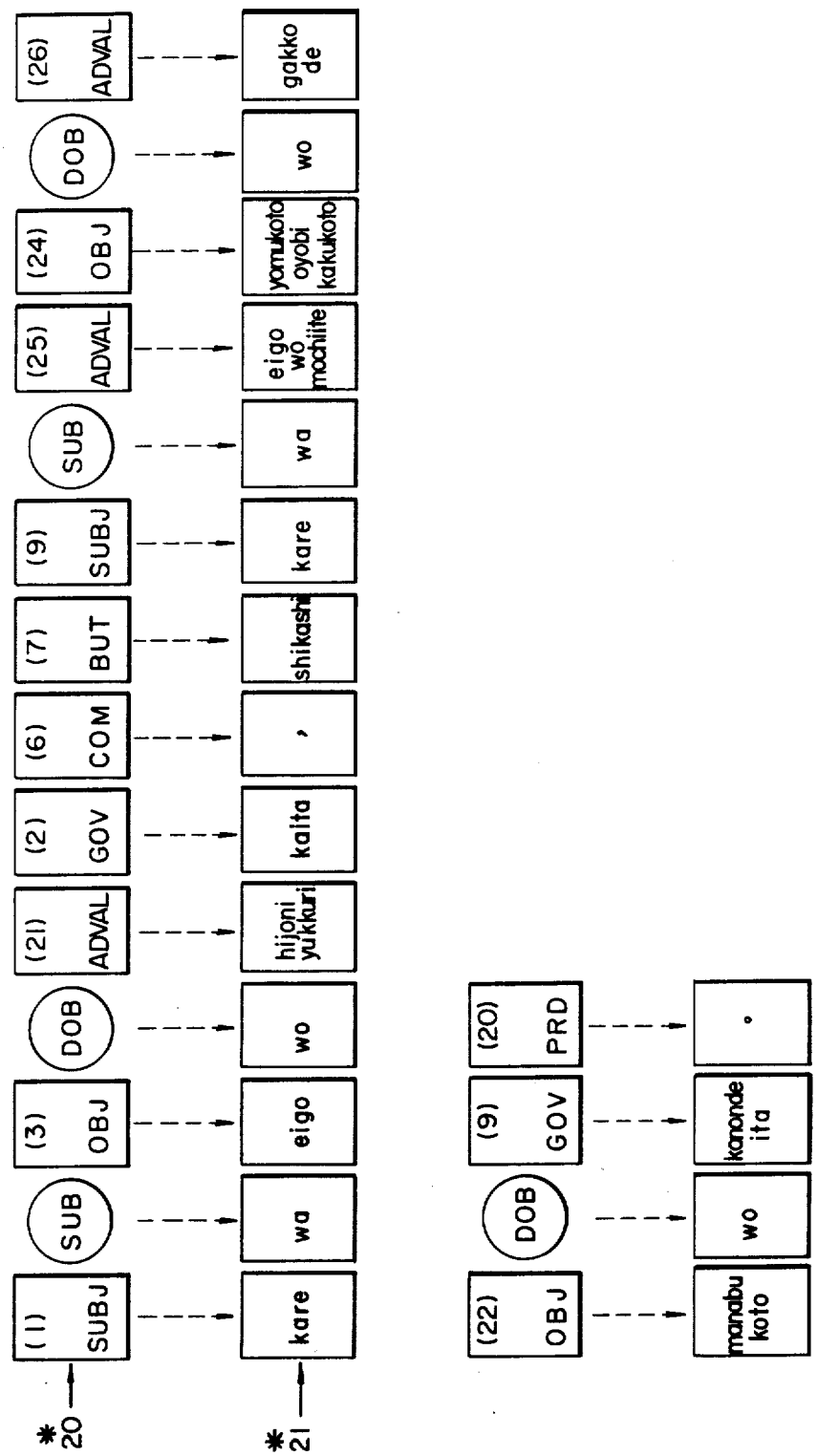
FIG. 26 shows a translated sentence added to an input English text by the Japanese sentence generation.

FIG. 26 shows a target language equivalent generated in the output text table area 408 through the Japanese sentence generation processing. The target language equivalents are assigned to the respective nodes in the Japanese sentence node string area 407 shown by *20 so that the target language equivalents shown by *21 are generated in the output text table area 408.

The preferred embodiments of the present invention have been explained. The present method offers the following advantages.

(1) When the word is inflected by tense or number, it is transformed to a stem before the lexicon is looked up. Accordingly, the number of words to be included in the lexicon can be substantially reduced.

(2) Both the word lexicon and the idiom lexicon are provided, and each word in the word lexicon has information indicating the presence or absence of idioms which include the word and pointers to the idiom lexicon. Accordingly, the idiom can be segmented while the word is segmented.

(3) After the text input, the same information as the contents of the word lexicon and the idiom lexicon is written in the fast access buffer storage. Accordingly, the lexicon look-up in the subsequent steps is carried out at a high speed.

(4) The idiom lexicon includes the fixed idiom lexicon as well as the split idiom lexicon, and the split idiom lexicon is looked up after the segmentation of the phrasal element. Accordingly, any idiom can be retrieved with a lexicon of small capacity.

(5) The part of speech analysis is completed before the sentence (tree/list) pattern analysis. Accordingly, the modification/addition of the sentence patterns and the modification/addition of the part of speech analysis rules can independently designed.

(6) The pattern of prohibited sequence of parts of speech is used and the priority table is used as required, to determine the parts of speech of the words and the idioms. Thus, the determination is fast and exact.

(7) The concept of phrasal element which is different from the phrase in the conventional English grammar is defined and the input English text is segmented by the phrasal element is form the string of parts of speech for the phrasal elements and the skeleton pattern. Accordingly, the formation of the skeleton pattern and the Japanese sentence generation are facilitated. In the concept of phrase in accordance with the conventional English grammar, there is included a noun phrase which includes a noun phrase or a verb phrase which includes a noun phrase and hence it is difficult to segment the phrase.

(8) In forming the English skeleton pattern, the concept of syntatic role is introduced such that the string parts of speech for the phrasal elements is transformed to the string of syntatic roles, then the clause or the quasi-clause is detected and the skeleton pattern of the sentence is formed from the clause or the quasi-clause. Accordingly, various patterns can be readily and exactly set and modified even for a complicated English sentence.

(9) In the analysis of the English sentence pattern, the hierachical structure with the phrasal elements at the bottom, the quasi-clausal or clausal nodes in the middle and the sentence node at the top is used. Accordingly, the transformation from the input language tree/list (English sentence) to the output language tree/list (Japanese sentence) can be simply implemented by the mere linear rearrangement along the sister nodes, and a prior art complex processing of tree transduce from input language tree diagram to output language tree diagram is avoided. The change of the tree/list transformation rules is also easy.

(10) For the phrasal element having the pending syntatic role, the dependency and modifying relation analysis is made to determine the modified item. Accordingly, the sentence having a complex modifying relation can be translated. Since the skeleton pattern comprises the phrasal elements other than those having the syntatic roles which modify other items such as the adjective or adverb, the number of types of the skeleton pattern is not large.

(11) Since the Japanese sentence generation processing includes the tense/mode processing and the attached word processing, an exact translation is attainable.

(12) In the Japanese sentence generation processing, the tense/mode processing is limited to the nodes having the governors (GOV group) as the syntatic roles and the attached word processing is limited to the nodes having the subjects (SUBJ group) and the objects (OBJ group) as the syntatic roles, the processing is simplified and the modification and the transformation are easy.

(13) The translation rules in the steps of the input English text analysis, the tree/list transformation and the output Japanese sentence generation are stored in the pattern storages in the form of table and the translation processing unit is designed to interprete those tables. Accordingly, the change, modification or addition of the translation rules can be effected by simply updating the information in the pattern memories independently from the translation processing unit.

What is claimed is:

1. An automatic translation method between natural languages using a translation processing apparatus to which an input text sentence composed of a natural language is inputted in the form of an electrical signal from an input device and which carries out predetermined translation processes by referring to an electronic data storage device having a word/idiom lexicon storage area in which target language equivalent information and part of speech information on words/idioms are stored and a plurality of table storage areas in which tables defining predetermined translation rules are stored, said method comprising:

(a) a first step of assigning parts of speech to a string of words/idioms of the input text sentence inputted from said input device by referring to said word-/idiom lexicon storage area of said electronic data storage device so as to provide a corresponding string of parts of speech;

(b) a second step of dividing the input text sentence transformed in the form of said string of parts of speech into phrasal elements which are minimum units having linguistic meanings and assigning phrasal parts of speech to the respective phrasal elements by referring to a first table storage area of said electronic data storage device in which a table indicating a relation between patterns of strings of predetermined parts of speech which form the phrasal elements and phrasal parts of speech of the phrasal elements is stored;

(c) a third step of comparing the sequence of phrasal parts of speech assigned to the phrasal elements and the words/idioms with predetermined strings of parts of speech to assign syntatic roles to the respective phrasal elements and words/idioms, said predetermined strings of parts of speech being stored in a second table storage area of said electronic data storage device together with the syntatic roles associated therewith;

(d) a fourth step of detecting patterns representing a simple sentence, a clause and a quasi-clause from the string of syntatic roles to transform the input text sentence to a skeleton pattern represented by a combination of said patterns;

(e) a fifth step of transforming the sequence of simple sentence, clause and quasi-clause inherent to the input language which forms the skeleton pattern to a sequence of simple sentence, clause and quasi-clause inherent to an output language by applying a predetermined transformation rule which is stored in a third table storage area of said electronic data storage device;

(f) a sixth step of transforming the sequence of syntatic roles inherent to the input language within each of the simple sentence, clause and quasi-clause which forms said transformed skeleton pattern to a sequence of syntatic roles inherent to the output language by applying a predetermined transformation rule; and (g) a seventh step of assigning target language equivalents to the respective ones of the transformed string of syntatic roles to generate a sentence in the output language in the form of an electrical output signal.

2. An automatic translation method between natural languages according to claim 1, wherein said electronic data storage device has a fourth table storage area in which a table including predetermined patterns of prohibited sequences of parts of speech is stored, and wherein when there are a plurality of parts of speech to be assigned to the word/idiom in said first step, the table of said fourth table storage area is referred to in order to finally determine one of the plurality of parts of speech of the word/idiom.

3. An automatic translation method between natural languages according to claim 2, wherein the table of said fourth table storage area further includes data representing special conditions under which the prohibition is released, and the part of speech of the word-/idiom is determined by referring to both the pattern of prohibited sequence of parts of speech and the prohibition release condition.

4. An automatic translation method between natural languages according to claim 2, wherein the pattern of prohibited sequence of parts of speech comprises a string of parts of speech of a plurality of words before and after the word whose part of speech is to be determined.

5. An automatic translation method between natural languages according to claim 1, wherein said electronic data storage device has a fourth table storage area in which a priority table indicating priorities among parts of speech is stored, and wherein when there are a plurality of parts of speech to be assigned to the word/idiom in said first step, said priority table is referred to in order to finally determine one of the parts of speech of the word/idiom.

6. An automatic translation method between natural languages according to claim 1, wherein said electronic data storage device has a fourth table storage area in which a prohibition table storing therein predetermined patterns of prohibited sequences of parts of speech and a priority table indicating priorities among parts of speech are stored, and wherein when there are a plurality of parts of speech to be assigned to the word/idiom in said first step, said prohibition table is referred to in order to eliminate the prohibited parts of speech from the plurality of parts of speech of the word/idiom, and if two or more parts of speech still remain, said priority table is referred to in order to finally determine one of the parts of speech of the word/idiom.

7. An automatic translation method between natural languages according to claim 1, wherein said word-/idiom storage area of said electronic data storage device includes a word lexicon storage area in which an index word for the word, information on the presence or absence of idioms formed by the word, a target language equivalent of the word and part of speech information are stored, and an idiom lexicon memory storage area in which an index word of the idiom, a target language equivalent of the idiom and part of speech information are stored, and the lexicon look-up in said first step comprises:

a first phase for segmenting a word of the input text and transforming the word to a stem if the word has an inflectional ending;

a second phase for looking up said word lexicon storage area by using the stem of the word as an index word, and if no idiom which includes that word is retrieved, storing the target language equivalent of the word and the part of speech information in a buffer storage area of a working storage used by said translation processing unit; and a third phase for looking up said idiom lexicon storage area if an idiom which corresponds to the input text sentence is retrieved and storing the target language equivalent of the idiom and the part of speech information in said buffer storage area.

8. An automatic translation method between natural language according to claim 7, wherein at said third phase, when the idiom which includes the word stored in said buffer storage area is retrieved, the target language equivalent and the part of speech information of that idiom are stored in said buffer storage area while the word information of that word stored in said buffer storage area at said second phase is invalidated.

9. An automatic translation method between natural language according to claim 7, wherein at said third phase, when there are a plurality of idioms which corresponds to the input text sentence, the target language equivalent and the part of speech information for the longest idiom are stored in said buffer storage area.

10. An automatic translation method between natural languages according to claim 1, wherein said second step comprises:
- a first phase for comparing the string of parts of speech of the input text sentence with the pattern of the string of parts of speech in said first table storage area of said electronic data storage device; and
- a second phase for regarding the word/idiom as a node if the strings of parts of speech are not equal in the comparison and regarding the phrasal element as a node if the strings of parts of speech are equal and storing the part of speech information of the node and the discrimination of the word/idiom and the phrasal element are stored in a buffer storage area of a working storage used by said translation processing apparatus.

11. An automatic translation method between natural languages according to claim 10, wherein at said second phase, when a plurality of patterns of strings of parts of speech correspond to the input text sentence, the phrasal element for the longest pattern of string of parts of speech is regarded as the node.

12. An automatic translation method between natural languages according to claim 1, wherein said word-/idiom storage area of said electronic data storage device includes a word lexicon storage area, a fixed idiom lexicon storage area for the idioms each comprising a predetermined plurality of words and a split idiom lexicon storage area for the idioms each having a blank in a predetermined sequence of words so that an idiom is formed by inserting an appropriate word, phrase or clause in the blank, said word lexicon storage area and said fixed idiom lexicon storage area being looked upon in said first step and said split idiom lexicon storage area is looked up in said second step.

13. An automatic translation method between natural languages according to claim 1, wherein said second table storage area of said electronic data storage device includes a table indicating a relation between strings of parts of speech of the words and the phrasal elements before and after the verbal word and the strings of known syntatic roles which may assume those strings of parts of speech, and said third step comprises:
- a first phase for detecting a verb in the input text sentence; and
- a second phase for comparing the string of parts of speech of the words and phrasal elements before and after the verbal word in the input text sentence with the strings of parts of speech in said table of said second table storage area, and if the corresponding string is detected, assigning the string of syntatic roles corresponding to the string of parts of speech in the table to the string of words and phrasal elements.

14. An automatic translation method between natural languages according to claim 1, wherein said second table storage area of said electronic data storage device includes a table indicating a relation between strings of known syntatic roles which the string of words and phrasal elements before and after a conjunction word may assume and a syntatic role of that conjunction word, and said third step comprises:
- a first phase for detecting the conjunction word in the input text sentence;
- a second phase for comparing the string of syntatic roles of the words and phrasal elements before and after the conjunction word with the strings of syntatic roles in said table of said second table storage area; and
- a third phase for assigning the syntatic role of the conjunction word corresponding to the string of syntatic roles in the table of said second table storage area to that word when both strings of syntatic roles are equal in said second phase.

15. An automatic translation method between natural languages according to claim 1, wherein said second table storage area of said electronic data storage device includes a clause pattern table indicating a relation between clauses or quasi-clauses patterns and strings of syntatic roles which they may assume, and said fourth step comprises:
- a first phase for segmenting the input text sentence by a conjunction word and punctuation;
- a second phase for comparing the string of syntatic roles in the segmented section with the string of syntatic roles in said clause pattern table; and
- a third phase for assigning the clause or quasi-clause pattern corresponding to the string of syntatic roles to the input text in said segmented section if both strings of syntatic roles are equal in said second phase.

16. An automatic translation method between natural languages according to claim 15, wherein said second table storage area of said electronic data storage device further includes a skeleton pattern table indicating a relation between the sequence of clause or quasi-clause patterns and the skeleton patterns, and said fourth step comprises:
- a fourth phase for comparing the sequence of clause or quasi-clause patterns assigned to the input text with the sequnce of clause or quasi-clause patterns in said skeleton pattern table; and
- a fifth phase for assigning the corresponding skeleton pattern to the input text when both clause or quasi-clause patterns are euqal in said fourth phase.

17. An automatic translation method between natural languages according to claim 1, wherein said third table storage area of said electronic data storage device includes a tree/list transformation table indicating a relation between the skeleton patterns in the input language and the corresponding skeleton patterns in the output language, and said fifth step comprises:
- a first phase for comparing the skeleton pattern of the input text with the skeleton patterns in the input language stored in said tree/list transformation table; and
- a second phase for assigning the corresponding skeleton pattern in the output language to the input text when both patterns are equal in said first phase.

18. An automatic translation method between natural languages according to claim 1, wherein said third table storage area of said electronic data storage device includes a transformation table indicating a relation between the strings of syntatic roles in the input language and the corresponding strings of syntatic roles in the output language, and said sixth step comprises:
- a first phase for comparing the string of syntatic roles of the sentence, clause or quasi-clause which forms the skeleton pattern in the output language assigned to the input text with the strings of syntatic roles in the input language stored in said transformation table; and
- a second phase for transforming the string of syntatic roles of the sentence, clause or quasi-clause to the corresponding string of syntatic roles in the output language when both strings of syntatic roles are equal in said first phase;
- said first and second phases being repeated until a category of a node having the syntatic role assigned thereto appears as the phrasal element on the word.

* * * * *